(12) United States Patent
Ohkawa et al.

(10) Patent No.: US 11,761,520 B2
(45) Date of Patent: Sep. 19, 2023

(54) LINEAR DRIVE DEVICE, MOTOR, AND LINEAR DRIVE DEVICE PRODUCTION METHOD

(71) Applicant: Continental Automotive GmbH, Hannover (DE)

(72) Inventors: Takanori Ohkawa, Nagano (JP); Hiroyuki Hatasako, Nagano (JP); Takafumi Kasuga, Nagano (JP); Takahisa Ueki, Nagano (JP); Ulrich Kolloch, Seligenstadt (DE)

(73) Assignee: Continental Automotive Technologies GmbH, Hannover (DE)

( * ) Notice: Subject to any disclaimer, the term of this patent is extended or adjusted under 35 U.S.C. 154(b) by 81 days.

(21) Appl. No.: 16/347,591

(22) PCT Filed: Nov. 7, 2017

(86) PCT No.: PCT/JP2017/040119
§ 371 (c)(1),
(2) Date: May 6, 2019

(87) PCT Pub. No.: WO2018/084312
PCT Pub. Date: May 11, 2018

(65) Prior Publication Data
US 2019/0346028 A1    Nov. 14, 2019

(30) Foreign Application Priority Data

Nov. 7, 2016 (JP) .................... 2016-217093
Mar. 8, 2017 (JP) .................... 2017-043845
Mar. 8, 2017 (JP) .................... 2017-043846

(51) Int. Cl.
*F16H 25/20* (2006.01)
*F16H 25/24* (2006.01)
*H02K 7/06* (2006.01)

(52) U.S. Cl.
CPC ............. *F16H 25/20* (2013.01); *F16H 25/24* (2013.01); *H02K 7/06* (2013.01)

(58) Field of Classification Search
CPC .. F16H 25/2003; F16H 25/2015; F16H 25/20; F16H 25/24; F16H 2025/2012;
(Continued)

(56) References Cited

U.S. PATENT DOCUMENTS 2,857,778 A * 10/1958 Rokos .................... G05G 23/00
74/441
3,094,011 A * 6/1963 Bradley .................. B23Q 5/56
74/441

(Continued)

FOREIGN PATENT DOCUMENTS

CN        1457409       11/2003
CN      101587220       11/2009

(Continued)

OTHER PUBLICATIONS

"International Preliminary Report on Patentability (Form PCT/IB/373) of PCT/JP2017/040119," dated May 7, 2019, with English translation thereof, pp. 1-22.

(Continued)

*Primary Examiner* — Gregory Robert Weber
(74) *Attorney, Agent, or Firm* — JCIPRNET

(57) ABSTRACT

In a linear drive device, a movable member is driven using a guide shaft and a lead screw supported by a bracket. Since a nut mechanism, which with the lead screw configures a feed screw mechanism, is provided with a first spring between two nuts, it is possible to limit rattling of the nuts with respect to the lead screw. Of the two nuts, the first nut provided on the side opposite a motor and a first plate is not able to move relative to the movable member in the axis direction. As a result, when a member to be driven is loaded (Continued)

on the movable member and the movable member is driven in the direction approaching the first plate, the first plate and members disposed therearound are not susceptible to interference by the member being driven.

25 Claims, 21 Drawing Sheets

(58) Field of Classification Search
CPC .......... F16H 25/2006; Y10T 74/18649; Y10T 74/18656; Y10T 74/18632; Y10T 74/18648; H02K 7/06
USPC ................................. 74/89.3, 89.32
See application file for complete search history.

(56) References Cited

U.S. PATENT DOCUMENTS

| | | | |
|---|---|---|---|
| 5,910,192 A * | 6/1999 | Pulford, Jr. ............ | G05G 11/00 74/479.01 |
| 5,913,941 A | 6/1999 | Erikson et al. | |
| 6,053,065 A | 4/2000 | Melzer | |
| 6,724,714 B1 | 4/2004 | Kato et al. | |
| 7,124,419 B2 * | 10/2006 | Fujibayashi ........ | F16H 25/2006 720/663 |
| 7,940,480 B2 * | 5/2011 | Huang ................ | F16H 25/2006 359/823 |
| 8,024,987 B2 * | 9/2011 | Yamaguchi ............. | F16H 25/20 74/89.23 |
| 8,369,024 B2 | 2/2013 | Tsuchiya et al. | |
| 8,503,118 B2 | 8/2013 | Wakayama et al. | |
| 9,010,205 B2 * | 4/2015 | Schroeder ............... | F16H 25/20 74/89.32 |
| 9,440,673 B2 | 9/2016 | Nakamura et al. | |
| 2005/0011291 A1 * | 1/2005 | Nagai ..................... | F16H 25/20 74/89.32 |
| 2007/0214902 A1 * | 9/2007 | Wang .................. | F16H 25/2472 74/89.26 |
| 2007/0277638 A1 * | 12/2007 | Kirk .................... | F16H 25/2006 74/424.95 |
| 2011/0132113 A1 * | 6/2011 | Song ................... | F16H 25/2006 74/10.85 |
| 2012/0212081 A1 * | 8/2012 | Oh ....................... | H02K 5/1672 310/49.13 |
| 2013/0019704 A1 | 1/2013 | Kim | |
| 2013/0133448 A1 | 5/2013 | Schroeder et al. | |
| 2014/0373653 A1 | 12/2014 | Oikawa | |

FOREIGN PATENT DOCUMENTS

| | | | |
|---|---|---|---|
| CN | 101821656 | 9/2010 | |
| CN | 102094950 | 6/2011 | |
| CN | 102313962 | 1/2012 | |
| CN | 102385132 | 3/2012 | |
| CN | 104943741 | 9/2015 | |
| CN | 204921886 | 12/2015 | |
| DE | 202007017535 | 4/2009 | |
| DE | 102015012855 B3 * | 4/2017 | ......... F16H 25/2006 |
| JP | H07332455 | 12/1995 | |
| JP | H08-184742 A * | 7/1996 | |
| JP | H08184742 | 7/1996 | |
| JP | H09135562 | 5/1997 | |
| JP | H11265212 | 9/1999 | |
| JP | 2005304111 | 10/2005 | |
| JP | 2005304111 A * | 10/2005 | |
| JP | 2009169102 | 7/2009 | |
| JP | 2009169102 A * | 7/2009 | ......... F16H 25/2006 |
| JP | 2016-57470 | 4/2016 | |
| WO | 9720154 | 6/1997 | |

OTHER PUBLICATIONS

"Office Action of Japan Counterpart Application", dated May 12, 2020, with English translation thereof, pp. 1-15.

"International Search Report (Form PCT/ISA/210) of PCT/JP2017/040119," dated Jan. 16, 2018, with English translation thereof, pp. 1-4.

Office Action of China Counterpart Application, with English translation thereof, dated Jul. 29, 2021, pp. 1-55.

Qin Ri-Qiang, "Measures and Practice on Bridging Precision Errors of NC Machine Ball Screws", Journal of Nanning Polytechnic, vol. 16, Issue 3, May 2011, with English abstract, pp. 1-3.

Li Jun et al., "Study on the design for the set of adjust clearance in the screw and nut based on spire driving machine", Mechanical Research & Application, vol. 18, Issue 4, Aug. 2005, with English abstract, pp. 1-2.

"Office Action of German Counterpart Application", dated Nov. 29, 2022, with English translation thereof, p. 1-p. 14.

* cited by examiner

LINEAR DRIVE DEVICE, MOTOR, AND LINEAR DRIVE DEVICE PRODUCTION METHOD

CROSS-REFERENCE TO RELATED APPLICATION

This application is a 371 application of the International PCT application serial no. PCT/JP2017/040119, filed on Nov. 7, 2017, which claims the priority benefits of Japan Patent Application No. 2016-217093, filed on Nov. 7, 2016, Japan Patent Application No. 2017-043845, filed on Mar. 8, 2017, and Japan Patent Application No. 2017-043846, filed on Mar. 8, 2017. The entirety of each of the above-mentioned patent applications is hereby incorporated by reference herein and made a part of this specification.

TECHNICAL FIELD

The present invention relates to a linear drive device that linearly moves a movable member according to rotation of a lead screw, a motor, and a linear drive device production method.

BACKGROUND ART

As a linear drive device that converts a rotational motion of a motor into a linear motion and causes a movable member to reciprocate in a linear direction, a linear drive device disclosed in Patent Literature 1 by the present inventors or the like is known. As illustrated in FIG. 23 and FIG. 24, the linear drive device disclosed in Patent Literature 1 includes a motor 20, a lead screw 22 rotatable integrally with an output shaft 21 of the motor 20, a slider 24 into which a nut 23 meshing with the lead screw 22 is assembled in a non-rotatable manner, a guide shaft 25 disposed parallel to and at an interval from the lead screw 22 and inserted through a hole 24a formed in the slider 24, and a bracket 26 fixed to a casing 39 of the motor 20. FIG. 23 is an illustrative view of a linear drive device in an example of the related art. FIG. 24 is an illustrative view of a movable member used for the linear drive device illustrated in FIG. 23 and is a cross-sectional view taken along a line C-C in FIG. 23.

The bracket 26 includes a first plate portion 261 (one end portion) fixed to the casing 39 of the motor 20, a second plate portion 262 facing the first plate portion 261 on the distal end side of the lead screw 22, and a third plate portion 263 connecting the first plate portion 261 to the second plate portion 262 (the other end portion), and a plate surface of the third plate portion 263 extends parallel to the lead screw 22. A distal end portion of the lead screw 22 is rotatably supported by bearings 26a provided in the second plate portion 262, and both end portions of the guide shaft 25 disposed in an obliquely upward direction of the lead screw 22 are supported by both end portions of the bracket 26.

In the linear drive device, the slider 24 supporting the nut 23 meshing with the lead screw 22 is caused to linearly reciprocate in the direction of the axis L by rotating the lead screw 22 using the motor 20. In such a linear drive device, there is a problem that rattling in a circumferential direction occurs in the slider 24 and an error may be generated in an operation at the time of starting, stopping, or reversing the motor 20 due to a clearance between thread ridges of the lead screw 22 and the nut 23 or a clearance between the hole portion 24a of the slider 24 and the guide shaft 25. Therefore, in the linear drive device disclosed in Patent Literature 1, the slider 24 is divided in two into a slider main body 27 and a movable portion 28 in the circumferential direction of the lead screw 22, and a spring 29 that biases both of the slider main body 27 and the movable portion 28 in a direction opposite to a circumferential direction indicated by an arrow S in FIG. 24 is provided between the slider main body 27 and the movable portion 28, as illustrated in FIG. 23. Steel balls 90 rolling on the bracket 26 are respectively provided at distal ends of the leg portions 27a and 28a extending from the slider main body 27 and the movable portion 28 to the bracket 26. Therefore, by pressing the leg portions 27a and 28a of the slider main body 27 and the movable portion 28 against the bracket 26 using a biasing force of the spring 29, it is possible to prevent rattling in the circumferential direction from occurring in the slider 24 at the time of starting, stopping, or reversing the motor 20.

Here, in the linear drive device illustrated in FIG. 23, a nut mechanism in which a spring 230 is disposed between the two nuts 23 is used. In the nut mechanism, the nut 23a provided on the side opposite to the motor 20 and the first plate portion 261 among the two nuts 23 is supported by the slider 24 to be relatively movable in the direction of the axis L with respect to the slider 24, and the nut 23b provided on the motor 20 side and the first plate portion 261 side is supported by the slider 24 not to be relatively movable in the direction of the axis L with respect to the slider 24. The spring 230 biases the nut 23a to the side opposite to the motor 20 and the first plate portion 261. Therefore, it is possible to suppress rattling of the nut 23 with respect to the lead screw 22.

CITATION LIST

Patent Literature

[Patent Literature 1]
Japanese Unexamined Patent Application Publication No. 2016-57470

SUMMARY OF INVENTION

Technical Problem

In the linear drive device illustrated in FIGS. 23 and 24, a driven member (not illustrated) is mounted with respect to the slider 24 and linearly moved. However, the linear drive device described in Patent Literature 1 has a structure in which the nut 23b provided on the motor 20 side and the first plate portion 261 side is supported by the slider 24 not to be relatively movable with respect to the slider 24 when rattling of the nuts 23 with respect to the lead screw 22 is suppressed using the two nuts 23. Therefore, there is a problem that a movable range of the slider 24 is narrowed because it is easy for the driven member to interfere with the motor 20, the first plate portion 261, and members disposed around the motor 20 and the first plate portion 261 when the driven member is mounted at a position biased to the side in which the motor 20 and the first plate portion 261 are located with respect to the slider 24 and the slider 24 is driven in a direction approaching to the motor 20 and the first plate portion 261.

Further, in the linear drive device illustrated in FIGS. 23 and 24, since the slider 24 is divided into the slider main body 27 and the movable portion 28, the spring 29 is assembled therebetween, and the steel balls 90 for rolling are provided at the distal ends of both the leg portions 27a and 28a, there is a problem that a structure is complicated and the number of components is increased, resulting in a high manufacturing cost. Furthermore, there is a problem that it is necessary to increase a bending strength of the bracket 26, a thickness dimension of the bracket 26 is increased, and it is necessary to increase flatness of the plate surface because constant pressure is constantly performed to the bracket 26 from the leg portions 27a and 28a of the slider 24 via the steel balls 90 and traveling on the bracket 26.

In view of the above problems, an objective of the present invention is to provide a linear drive device, a motor, and a linear drive device production method capable of reducing rattling with a more appropriate structure.

Solution to Problem

In order to solve the problem, an aspect of the present invention is to be able to set a movable range of a movable member to be wide even when rattling is reduced. That is, an aspect of the present invention is a linear drive device including: a motor; a lead screw that rotates around an axis integrally with an output shaft of the motor; a nut mechanism that constitutes a feed screw mechanism together with the lead screw; a guide shaft that extends parallel to the lead screw; a movable member that is movably supported by the guide shaft and driven in an axial direction of the lead screw by the motor via the nut mechanism; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein the nut mechanism includes a first nut portion that is not relatively movable in an axial direction of the lead screw with respect to the movable member, a second nut portion that is relatively movable in the axial direction with respect to the movable member toward the first plate portion side from the first nut portion, and a first spring that biases the second nut portion in the axial direction.

In the present invention, since the movable member is driven using the guide shaft and the lead screw supported by the bracket, it is difficult for rattling to occur when the movable member is driven. Further, since the nut mechanism including the two nut portions (the first nut portion and the second nut portion) and the first spring is used, it is possible to suppress the rattling of the nut portions with respect to the lead screw. Even in this case, the first nut portion provided on the side opposite to the motor and the first plate portion between the two nut portions is not relatively movable with respect to the movable member. Therefore, since the driven member is mounted at a position biased to the side opposite to the motor and the first plate portion when the driven member is mounted on the movable member, it is possible to reduce rattling in a more appropriate structure. For example, it is possible to widen a movable range of the movable member.

In the present invention, it is possible to adopt an aspect in which the lead screw and the guide shaft are disposed at positions overlapping in a vertical direction. According to such an aspect, it is possible to receive a load of the movable member in a stable state using the guide shaft and the lead screw. Therefore, it is possible to stably drive the movable member and the driven member and appropriately reduce rattling.

In the present invention, it is possible to adopt an aspect in which a mounting portion of the driven member is provided in the movable member, and a center of the mounting portion overlaps the lead screw and the guide shaft in a vertical direction. According to such an aspect, it is possible to receive loads of the movable member and the driven member in a stable state using the guide shaft and the lead screw in a state in which the driven member is mounted in the movable member.

In the present invention, it is possible to adopt an aspect in which the movable member is formed with plane symmetry with respect to a virtual plane defined by a central axis of the lead screw and a central axis of the guide shaft. According to such an aspect, it is possible to receive the loads of the movable member and the driven member in a stable state using the guide shaft and the lead screw.

In the present invention, it is possible to adopt an aspect in which a switch capable of detecting the movable member is held in the bracket. According to such an aspect, since the switch can be disposed at an appropriate position with respect to the bracket, it is possible to accurately detect the approach of the movable member to the motor and the first plate portion.

In the present invention, it is possible to adopt an aspect in which the switch is held in the first plate portion. In this case, it is possible to adopt an aspect in which a fourth plate portion bent toward the second plate portion is provided in an end portion of the first plate portion on the side opposite to the third plate portion, and the switch is held in the fourth plate portion.

In the present invention, it is possible to adopt an aspect in which the fourth plate portion is parallel to the third plate portion.

In the present invention, it is possible to adopt an aspect in which the switch is a contact type switch that detects the movable member according to contact of the movable member. In such a configuration, the effect of placing the switch at an appropriate position with respect to the bracket is significant.

In the present invention, it is possible to adopt an aspect in which a plate portion that projects to the side opposite to the third plate portion and is able to come into contact with the switch is provided in the movable member.

In the present invention, it is possible to adopt an aspect in which the first spring is a coil spring in which the lead screw passes through an inner side thereof, the second nut portion includes a cylindrical portion having female threads meshing with the lead screw formed on an inner circumferential surface, and a rectangular flange portion formed at an end portion of the cylindrical portion on the side opposite to the coil spring, and the flange portion receives a first end portion of the first spring.

In the present invention, it is possible to adopt an aspect in which in the second nut portion, a groove-like concave portion that receives the first end portion is formed on a surface of the flange portion on the coil spring side. According to such an aspect, it is possible to prevent the first end portion of the coil spring from becoming disengaged from the second nut portion.

In the present invention, it is possible to adopt an aspect in which the groove-like concave portion has a depth equal to or greater than ½ of a diameter of a wire material constituting the coil spring.

In the present invention, it is possible to adopt an aspect in which the groove-like concave portion is formed between the cylindrical portion and a projection projecting toward the coil spring side from the flange portion.

In the present invention, it is possible to adopt an aspect in which the first spring is a coil spring in which the lead screw passes through an inner side thereof, the first nut portion includes a cylindrical portion having female threads meshing with the lead screw formed on an inner circumferential surface, and a rectangular flange portion formed at an end portion of the cylindrical portion on the side opposite to the coil spring, the movable member includes a support plate portion that is interposed between the coil spring and the flange of the first nut portion and against which a second end portion of the coil spring on the first nut portion side and a surface of the first nut portion on the coil spring side of the flange abut, a notch-like opening portion directed to an open end in a direction perpendicular to the axial direction is formed in the support plate portion, the cylindrical portion of the first nut portion is located on an inner side of the opening portion, and an inner circumferential surface located on the side opposite to the open end side of the opening portion is a circular arc surface that is bent along an outer circumferential surface of the cylindrical portion of the first nut portion and abuts against the cylindrical portion of the first nut portion. According to such an aspect, even when the second end portion of the coil spring is supported by the movable member, the second end portion of the coil spring can be supported by the movable member over a wide range in the circumferential direction.

In the present invention, it is possible to adopt an aspect in which a mark that aligns an angular position of the first nut portion and the second nut portion is provided in each of the first nut portion and the second nut portion. According to such an aspect, it is possible to accurately match the angular positions of the first nut portion and the second nut portion using the marks. Therefore, even when a pitch of the male threads of the lead screw (pitch of the female threads of the nut portion) is enlarged, it is possible to dispose the first nut portion and the second nut portion in an appropriate phase with respect to the lead screw.

In the present invention, it is possible to adopt an aspect in which the mark is located on the side to which the open end is directed in each of the first nut portion and the second nut portion. According to such an aspect, it is easy to visually recognize the marks.

In the present invention, it is possible to adopt an aspect in which the mark is a projecting ridge. According to such an aspect, it is easy to visually recognize the marks.

In the present invention, it is possible to adopt an aspect in which a first shaft hole into which the guide shaft is fitted is formed in the first plate portion, a second shaft hole into which the guide shaft is fitted is formed in the second plate portion, the guide shaft is pressed into one shaft hole of the first shaft hole and the second shaft hole, an inner diameter of the other shaft hole being greater than an outer diameter of the guide shaft, and a portion of the guide shaft in the circumferential direction abuts against an inner circumferential surface of the other shaft hole, and another portion in the circumferential direction abuts against a partial overhanging portion of the inner circumferential surface of the other shaft hole. According to such an aspect, since the guide shaft is disposed with reference to the place against which a portion of the guide shaft in the circumferential direction in the inner circumferential surface of the other shaft hole abuts, it is possible to provide the guide shaft at an appropriate position when the place against which a portion of the guide shaft in the circumferential direction in the inner circumferential surface of the other shaft hole abuts is accurately formed with respect to the one shaft hole. Therefore, it is possible to improve, for example, the accuracy of parallelism between the lead screw and the guide shaft.

In the present invention, it is possible to adopt an aspect in which the portion abuts against an inner circumferential surface of the other shaft hole on the lead screw side in a circumferential direction of the guide shaft, and the other portion abuts against the overhanging portion formed by caulking on the side opposite to the lead screw in the circumferential direction of the guide shaft.

In the present invention, it is possible to adopt an aspect in which the third plate portion extends in parallel to the guide axis, and the movable member includes a pair of buffering arm portions with flexible that project toward opposite sides with the lead screw interposed therebetween to face the third plate portion, and a leg portion which is bent toward the third plate portion from a distal end of each of the pair of buffering arm portions and abuts against the third plate portion. According to such an aspect, it is possible to suppress the amount of rotation (rotation angle) to be small due to the leg portion abutting against the plate surface of the bracket when the movable member tries to rotate. In addition, since the buffering arm portion is provided, it is possible to absorb shock due to the buffering arm portion being bent when the leg portion abuts against the plate surface of the bracket, and accordingly, to prevent the generation of abnormal noise. Therefore, it is possible to effectively reduce rattling in the circumferential direction due to a clearance between the movable member and the lead screw at the time of, for example, starting and stopping the motor using a simple structure without increasing the number of components. Therefore, it is possible to prevent an error from occurring rattling.

In the present invention, it is possible to adopt an aspect in which in the output shaft, an opposite output side end portion located on the side opposite to the bracket projects from an opposite output side end surface located on the side opposite to the bracket of the casing, a second spring having a plate shape that presses the opposite output side end portion of the output shaft toward the output side in which the bracket is located is fixed to the opposite output side end surface, the opposite output side end portion is formed by a flat surface or a spherical surface, and the second spring includes a fixing portion fixed to the opposite output side end surface of the casing, a biasing portion that is bent to be spaced apart from the output shaft and extends to the side in which the opposite output side end portion is located from the fixing portion, and a pressing portion that extends in a direction in which the pressing portion is spaced apart from the opposite output side end portion while being bent in a direction opposite to the biasing portion to abut against the opposite output side end portion from the biasing portion. According to such an aspect, when the pressing portion is brought into line contact or point contact with the end portion (opposite output side end portion) formed on the flat surface or the spherical surface of the output shaft projecting to the outer side from the one end surface (opposite output side end surface) of the casing, it is possible to press the output shaft (the lead screw) in the axial direction using an elastic force of the biasing portion of the second spring having a circular arc shape. Accordingly, it is possible to suppress, for example, rattling caused between the threads of the lead screw, and therefore, it is possible to reduce an error at the time of an operation. In addition, even when the amount of projection of the output shaft from one end surface (opposite output side end surface) of the casing is different, the output shaft can constantly be pressed in the axial direction. Thus, it is possible to suppress impediments such as local wear due to partial contact with the bearing caused by inclination of the pressing force from the second spring to the output shaft with respect to the axial direction, or generation of noise.

In the present invention, it is possible to adopt an aspect in which in at least one nut portion of the first nut portion and the second nut portion, a projection that abuts against a wall surface of the movable member earlier than a corner of an outer circumferential surface of the nut portion when the nut portion tries to rotate around the axis line is provided. According to such an aspect, even when a gap is formed between the wall surface of the movable member and the nut portion, the projection of the nut portion abuts against the wall surface of the nut accommodating portion at the time of starting and stopping the motor. Thus, it is possible to realize prevention or a large reduction in generation of abnormal noise that is generated between the nut portion and the movable member.

An objective of another embodiment of the linear drive device according to the present invention is to appropriately suppress rattling by adopting a configuration such that loads of a movable member and a driven member are appropriately applied to a guide shaft and a lead screw when the rattling of the movable member has been reduced by providing the guide shaft. That is, another aspect of the linear drive device according to the present invention is a linear drive device including: a motor; a lead screw that rotates around an axis integrally with an output shaft of the motor; a nut portion that constitutes a feed screw mechanism together with the lead screw; a guide shaft that extends parallel to the lead screw; a movable member that is movably supported by the guide shaft and driven in an axial direction of the lead screw by the motor via the nut portion; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein the lead screw and the guide shaft are disposed at positions overlapping in a vertical direction. According to such an aspect, since the movable member is driven using the guide shaft and the lead screw supported by the bracket, it is difficult for rattling to occur when the movable member is driven. In addition, since the loads of a movable member and a driven member are appropriately applied to a guide shaft and a lead screw, it is possible to stably drive the movable member and the driven member and to appropriately reduce rattling.

An objective of another aspect of the linear drive device according to the present invention is to appropriately dispose a switch using the fact that rattling of a movable member is reduced by using a guide shaft and a lead screw supported by a bracket. That is, another aspect of the linear drive device according to the present invention is a linear drive device including: a motor; a lead screw that rotates around an axis integrally with an output shaft of the motor; a nut portion that constitutes a feed screw mechanism together with the lead screw; a guide shaft that extends parallel to the lead screw; a movable member that is movably supported by the guide shaft and driven in an axial direction of the lead screw by the motor via the nut portion; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein a switch capable of detecting the movable member is held in the bracket. According to such an aspect, since the movable member is driven using the guide shaft and the lead screw supported by the bracket, it is difficult for rattling to occur when the movable member is driven. Further, since the switch can be disposed at an appropriate position with respect to the bracket, it is possible to accurately detect the approach of the movable member to the motor and the first plate portion.

An objective of another aspect of the linear drive device according to the present invention is to prevent dropping out of the first spring from the nut portion when rattling of the nut portion is reduced using a nut mechanism including two nut portions and a first spring. That is, another aspect of the linear drive device according to the present invention is a linear drive device including: a motor; a lead screw that rotates around an axis integrally with an output shaft of the motor; a nut mechanism that constitutes a feed screw mechanism together with the lead screw; a guide shaft that extends parallel to the lead screw; a movable member that is movably supported by the guide shaft and driven in an axial direction of the lead screw by the motor via the nut mechanism; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein the nut mechanism includes a first nut portion that is not relatively movable in an axial direction of the lead screw with respect to the movable member, a second nut portion that is relatively movable in the axial direction with respect to the movable member, and a first spring that biases the second nut portion in the axial direction, the first spring is a coil spring in which the lead screw passes through an inner side thereof, the second nut portion includes a cylindrical portion having female threads meshing with the lead screw formed on an inner circumferential surface, and a rectangular flange portion formed at an end portion of the cylindrical portion on the side opposite to the coil spring, and the flange portion receives a first end portion of the first spring. According to such an aspect, since the movable member is driven using the guide shaft and the lead screw supported by the bracket, it is difficult for rattling to occur when the movable member is driven. Further, since the nut mechanism including the two nut portions and the first spring is used, it is possible to reduce rattling between the nut portion and the lead screw. In this case, since the first end portion of the coil spring is disposed around the cylindrical portion in the second nut portion, it is possible to prevent the first end portion of the coil spring from becoming disengaged from the second nut portion.

An objective of another aspect of the linear drive device according to the present invention is to support an end portion of a first spring in a stable state using a movable member when rattling of the nut portion is reduced using a nut mechanism including two nut portions and a first spring. That is, another aspect of the linear drive device according to the present invention is a linear drive device including: a motor; a lead screw that rotates around an axis integrally with an output shaft of the motor; a nut mechanism that constitutes a feed screw mechanism together with the lead screw; a guide shaft that extends parallel to the lead screw; a movable member that is movably supported by the guide shaft and driven in an axial direction of the lead screw by the motor via the nut mechanism; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein the nut mechanism includes a first nut portion that is not relatively movable in an axial direction of the lead screw with respect to the movable member, a second nut portion that is relatively movable in the axial direction with respect to the movable member, and a first spring that biases the second nut portion in the axial direction, the first spring is a coil spring in which the lead screw passes through an inner side thereof, the first nut portion includes a cylindrical portion having female threads meshing with the lead screw formed on an inner circumferential surface, and a rectangular flange portion formed at an end portion of the cylindrical portion on the side opposite to the coil spring, the movable member includes a support plate portion that is interposed between the coil spring and the flange of the first nut portion and against which a second end portion of the coil spring on the first nut portion side and a surface of the first nut portion on the coil spring side of the flange abut, a notch-like opening portion directed to an open end in a direction perpendicular to the axial direction is formed in the support plate portion, and the cylindrical portion of the first nut portion is located on an inner side of the opening portion, an inner circumferential surface located on the side opposite to the open end side of the opening portion is a circular arc surface that is bent along an outer circumferential surface of the cylindrical portion of the first nut portion and abuts against the cylindrical portion of the first nut portion. According to such an aspect, since the movable member is driven using the guide shaft and the lead screw supported by the bracket, it is difficult for rattling to occur when the movable member is driven. Further, since the nut mechanism including the two nut portions and the first spring is used, it is possible to reduce rattling between the nut portion and the lead screw. Further, even when the second end portion of the coil spring is supported by the movable member, the second end portion of the coil spring can be supported by the movable member over a wide range in the circumferential direction.

An objective of another aspect of the linear drive device according to the present invention is to support an end portion of a first spring in a stable state using a movable member when rattling of the nut portion is reduced using a nut mechanism including two nut portions and a first spring. That is, another aspect of the linear drive device according to the present invention is a linear drive device including: a motor; a lead screw that rotates around an axis integrally with an output shaft of the motor; a nut mechanism that constitutes a feed screw mechanism together with the lead screw; a guide shaft that extends parallel to the lead screw; a movable member that is movably supported by the guide shaft and driven in an axial direction of the lead screw by the motor via the nut mechanism; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein the nut mechanism includes a first nut portion that is not relatively movable in an axial direction of the lead screw with respect to the movable member, a second nut portion that is relatively movable in the axial direction with respect to the movable member, and a first spring that biases the second nut portion in the axial direction, and a mark that aligns an angular position of the first nut portion and the second nut portion is provided in each of the first nut portion and the second nut portion. According to such an aspect, since the movable member is driven using the guide shaft and the lead screw supported by the bracket, it is difficult for rattling to occur when the movable member is driven. Further, since the nut mechanism including the two nut portions and the first spring is used, it is possible to reduce rattling between the nut portion and the lead screw. Further, since the marks for aligning the angular positions of the first nut portion and the second nut portion are provided in each of the first nut portion and the second nut portion, it is possible to accurately match the angular positions between the first nut portion and the second nut portion. Therefore, even when a pitch of the male threads of the lead screw (a pitch of the female threads of the nut portion) is enlarged, it is possible to dispose the first nut portion and the second nut portion in an appropriate phase with respect to the lead screw.

An objective of another aspect of the linear drive device according to the present invention is to reduce rattling of a movable member using a guide shaft and a lead screw supported by a bracket and to improve accuracy of parallelism between the guide shaft and the lead screw. That is, another aspect of the linear drive device according to the present invention is a linear drive device including: a motor; a lead screw that rotates around an axis integrally with an output shaft of the motor; a nut portion that constitutes a feed screw mechanism together with the lead screw; a guide shaft that extends parallel to the lead screw; a movable member that is movably supported by the guide shaft and driven in an axial direction of the lead screw by the motor via the nut portion; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein a first shaft hole into which the guide shaft is fitted is formed in the first plate portion, a second shaft hole into which the guide shaft is fitted is formed in the second plate portion, the guide shaft is pressed into one shaft hole of the first shaft hole and the second shaft hole, an inner diameter of the other shaft hole being greater than an outer diameter of the guide shaft, and a portion of the guide shaft in the circumferential direction abuts against an inner circumferential surface of the other shaft hole, and another portion in the circumferential direction abuts against a partial overhanging portion of the inner circumferential surface of the other shaft hole. According to such an aspect, since the movable member is driven using the guide shaft and the lead screw supported by the bracket, it is difficult for rattling to occur when the movable member is driven. Further, since the guide shaft is disposed with reference to the place against which a portion of the guide shaft in the circumferential direction in the inner circumferential surface of the other shaft hole abuts, it is possible to provide the guide shaft at an appropriate position when the place against which a portion of the guide shaft in the circumferential direction in the inner circumferential surface of the other shaft hole abuts is accurately formed with respect to the one shaft hole. Therefore, it is possible to improve, for example, the accuracy of parallelism between the lead screw and the guide shaft.

A problem of another aspect of the linear drive device according to the present invention is to simplify a structure in effectively reducing rattling of the movable member at the time of, for example, starting and stopping of a motor. That is, another aspect of the linear drive device according to the present invention is a linear drive device including: a motor; a lead screw coaxially integrally formed with an output shaft of the motor; a nut meshing with the lead screw, a guide shaft disposed parallel to and at an interval from the lead screw; a movable member that is movably provided on the guide shaft and to which the nut is non-rotatably attached; and a flat plate-like bracket having one end portion fixed to a casing of the motor with a plate surface extending parallel to the lead screw and the other end portion to which a bearing rotatably supporting an end portion of the lead screw being attached, wherein a buffering arm portion extending parallel to the plate surface of the bracket in a direction orthogonal to the axial direction or extending in a direction in which the buffering arm portion is gradually spaced apart from the plate surface toward a distal end, and projecting to the outer side of the bracket, and a leg portion bent toward the plate surface side of the bracket from the distal end of the buffering arm portion and having a distal end portion abutting against the plate surface of the bracket are integrally formed in both side portions of the movable member in the axial direction of the lead screw. According to such an aspect, since the buffering arm portion extending in a direction parallel to the plate surface of the bracket or extending in a direction in which the buffering arm portion is gradually spaced apart from the plate surface toward the distal end side and projecting to the outer side of the bracket is provided in both the side portions of the movable member, and the leg portion bent toward the plate surface side of the bracket such that a distal end portion of the leg portion abuts against the plate surface of the bracket is integrally formed at the distal end of the buffering arm portion, it is possible to suppress the amount of rotation (rotation angle) to be small due to the leg portion abutting against the plate surface of the bracket when the movable member tries to rotate. In addition, since the buffering arm portion extending parallel to the plate surface of the bracket or extending in a direction in which the buffering arm portion is gradually spaced apart from the plate surface toward the distal end is provided between the movable member and the leg portion, it is possible to absorb the shock due to the buffering arm portion being bent when the leg portion abuts against the plate surface of the bracket, and accordingly, to prevent the generation of abnormal noise. As a result, it is possible to effectively reduce rattling in the circumferential direction due to a clearance between the slider and the lead screw at the time of, for example, starting and stopping the motor using a simple structure without increasing the number of components, and accordingly, to prevent an error from occurring due to rattling.

In this case, it is possible to adopt an aspect in which a portion of the plate surface of the bracket in a range of abutting against a distal end of the leg portion is formed through a half-punching process for projection to the leg portion. According to such an aspect, since the half-punching process for projection to the leg portion side (the upper surface side of the bracket) is performed in a portion in a range in which the distal end of the leg portion abuts on the plate surface of the bracket, it is possible to improve the flatness of the portion at the time of the process and to ensure stable traveling in which vertical shaking is not caused in the movable member.

Further, it is possible to adopt an aspect in which one end of the output shaft is inserted through a bearing provided on one end surface of the casing and one end surface thereof projects from the one end surface and is supported to be rotatable, and a second spring having a flat plate shape that presses the output shaft in an axial direction is provided on one end surface of the casing, the one end surface of the output shaft is formed by a flat surface or a spherical surface, and the second spring is formed with a fixing portion formed in one end portion and fixed to the one end surface of the casing, a biasing portion formed by being bent in a convex circular arc shape in the axial direction, and a pressing portion formed by being bent in an inverse circular arc shape from the other end portion of the biasing portion, and an outer circumferential surface of the pressing portion abutting against the one end surface of the output shaft. According to such an aspect, since the pressing portion having an inverse circular arc shape is caused to come in line contact or point contact with the distal end surface formed as the flat surface or the spherical surface of the output shaft projecting to the outer side from the one end surface of the casing by an elastic force of the biasing portion having an arc-shape of the second spring to thereby press the output shaft (the lead screw) in the axial direction, it is possible to constantly press the output shaft in the axial direction even when the amount of projection of the output shaft from one end surface of the casing is different. As a result, it is possible to suppress impediments such as local wear due to partial contact with the bearing caused by inclination of the pressing force from the second spring to the output shaft with respect to the axial direction, or generation of noise.

An objective of aspect of the motor according to the present invention is to suppress rattling or the like caused between the threads of the lead screw and reduce an error at the time of an operation by providing a second spring constantly biasing the output shaft in the axial direction. That is, a motor according to the present invention is a motor in which a rotor magnet is rotatably provided through a gap within an excitation coil fixed in a casing, and one end surface of an output shaft integrally formed with a center of the rotor magnet and projecting from one end surface of the casing is biased toward the other end portion by a second spring provided on the end surface of the casing, wherein the one end surface of the output shaft is formed by a flat surface or a spherical surface, and the second spring is formed with a fixing portion formed in one end portion and fixed to the one end surface of the casing, a biasing portion formed by being bent in a convex circular arc shape in the axial direction of the output shaft, and a pressing portion formed by being bent in an inverse circular arc shape from the other end portion of the biasing portion, and an outer circumferential surface of the pressing portion abutting against the one end surface of the output shaft. According to such an aspect, since the pressing portion having an inverse circular arc shape is caused to come in line contact or point contact with the distal end surface formed as the flat surface or the spherical surface of the output shaft projecting to the outer side from the one end surface of the casing by an elastic force of the biasing portion having an arc-shape of the second spring to thereby press the output shaft (the lead screw) in the axial direction, it is possible to suppress rattling or the like caused between the threads of the lead screw and reduce an error at the time of an operation. In addition, even when the amount of projection of the output shaft from one end surface of the casing of the output shaft is different, the output shaft can constantly be pressed in the axial direction. Thus, it is possible to suppress impediments such as local wear due to partial contact with the bearing caused by inclination of the pressing force from the second spring to the output shaft with respect to the axial direction, or generation of noise.

In this case, it is possible to adopt an aspect in which the linear drive device including a lead screw coaxially integrally formed with the other end of the output shaft, a nut portion meshing with the lead screw, a guide shaft disposed parallel to and at an interval from the lead screw, and a movable member that is movably provided on the guide shaft and to which the nut portion is non-rotatably attached, wherein a bracket having a flat plate of which one end is fixed to the casing and a bearing extending in parallel to the lead screw and attached to the other end portion which rotatably supports an end portion of the lead screw is provided on the other end surface of the casing, and a buffering arm portion extending parallel to the plate surface of the bracket in a direction orthogonal to the axial direction or extending in a direction in which the buffering arm portion is gradually spaced apart from the plate surface toward a distal end, and projecting to the outer side of the bracket, and a leg portion bent toward the plate surface side of the bracket from the distal end of the buffering arm portion and having a distal end portion abutting against the plate surface of the bracket are integrally formed in both side portions of the movable member in the axial direction. In such a linear drive device, a phenomenon in which the movable member rotates in the circumferential direction around the lead screw as the center at the time of, for example, starting or reversing the motor occurs due to a slight clearance between the guide shaft and the through hole of the movable member through which the guide shaft is inserted. In this case, according to this aspect, since the buffering arm portion extending in a direction orthogonal to the axis in parallel to the plate surface of the bracket and projecting to the outer side of the bracket is provided in both the side portions of the movable member, and the leg portion bent toward the plate surface side of the bracket such that a distal end of the leg portion abuts against the plate surface of the bracket is integrally formed at the distal end of the buffering arm portion, it is possible to suppress the amount of rotation (rotation angle) to be small due to the leg portion abutting against the plate surface of the bracket when the movable member tries to rotate. In addition, since the buffering arm portion parallel to the plate surface of the bracket is provided between the movable member and the leg portion, the buffering arm portion can be bent and shock can be absorbed when the leg portion abuts against the plate surface of the bracket. Thus, it is possible to prevent generation of abnormal noise.

Further, it is possible to adopt an aspect in which a portion of the plate surface of the movable member in a range of abutting against a distal end portion of the leg portion is formed through a half-punching process for projection to the leg portion. According to such an aspect, since the half-punching process for projection to the leg portion side (the upper surface side of the bracket) is performed in a portion in a range in which the distal end of the leg portion abuts on the plate surface of the bracket, it is possible to improve the flatness of the portion at the time of the process and to ensure stable traveling in which vertical shaking is not caused in the movable member.

Another aspect of the linear drive device according to the present invention is a linear drive device including: a lead screw rotated and driven by a motor; an n-polygonal nut of which an outer circumferential surface screwed to the lead screw is formed as n square surfaces; a guide shaft disposed parallel to and at an interval from the lead screw; and a slide plate being movably provided on the guide shaft and a nut accommodating portion is formed in which the nut being inserted into and rotation of the nut is blocked by an inner wall; wherein a projection of which an outer surface is formed as a three-dimensional convex curved surface that comes in point contact with the inner wall of the nut accommodating portion and that has a height dimension allowing abutting against the inner wall earlier than a corner portion of the outer circumferential surface at the time of rotation of the nut is provided on a square surface of at least one of the outer circumferential surfaces of the nut facing the inner wall of the nut accommodating portion. According to such an aspect, since the projecting portion having a height dimension allowing the outer surface to come in point contact with the inner wall of the nut accommodating portion and to abut against the inner wall earlier than the corner portion of the outer circumferential surface at the time of rotation of the nut is provided on the outer circumferential surface of the nut facing the inner wall of the nut accommodating portion, it is possible to prevent or greatly suppress the generation of abnormal noise that is generated between the nut and the slide plate by the projection of the nut abutting against the inner wall of the nut accommodating portion at the time of starting or stopping the motor even when a gap is formed between the nut accommodating portion and the nut portion.

In this case, the nut is formed with a square outer shape, and the projections are formed at both end portions in a rotation direction on the two rectangular faces facing with respect to the axis of the nut. According to such an aspect, it is possible to cause the projection located on the side opposite to the axis to abut against the inner wall of the nut accommodating portion in a well-balanced manner at the time of starting and stopping the motor.

Another aspect of the present invention is a linear drive device production method, the linear drive device including a motor, a lead screw that rotates around an axis integrally with an output shaft of the motor, a nut mechanism that constitutes a feed screw mechanism together with the lead screw, a guide shaft that extends parallel to the lead screw, and a movable member that is movably supported by the guide shaft, the nut mechanism including a first nut portion disposed in a nut accommodating portion of the movable member not to be relatively movable in an axial direction of the lead screw with respect to the movable member, a second nut portion disposed to be relatively movable in the axial direction from the first nut portion, and a first spring biasing the second nut portion in the axial direction, and the movable member including a support plate portion located between the first nut portion and the first spring in the nut accommodating portion, wherein in the linear drive device production method, a notch-like opening portion directed to an open end in a direction orthogonal to the axial direction is provided in the support plate portion, a jig in which a notch having one end as an open end being formed is prepared, and in a step of assembling the first nut portion in the nut accommodating portion, the first spring is disposed between the first nut portion and the second nut portion attached to the lead screw, the jig is disposed between the first spring and the second spring, and then, the lead screw and the movable member are caused to approach each other in a direction orthogonal to the axial direction and the support plate portion pushes the jig such that the lead screw is disengaged from the notch through the open end of the notch and plugged into the inner side of the opening portion through the open end of the opening portion.

BRIEF DESCRIPTION OF DRAWINGS

FIG. 21(a) and FIG. 21(b) are illustrative views schematically illustrating a state when the nut portion is rotated around an axis of the lead screw in a case in which a projection illustrated in FIG. 19(a) and FIG. 19(b) is not provided.

DESCRIPTION OF EMBODIMENTS

A linear drive device, a motor, and a linear drive device production method to which the present invention is applied will be described with reference to the drawings.

(Configuration of Linear Drive Device 100)

Figure 1:
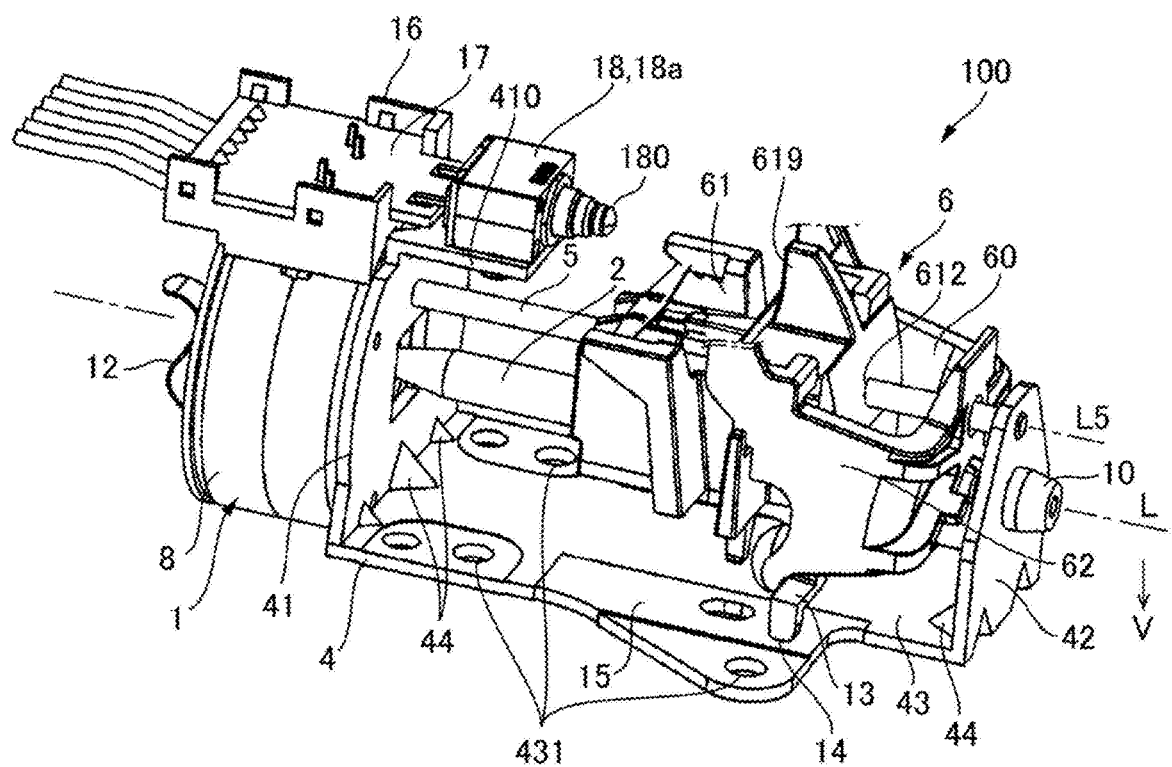
FIG. 1 is a perspective view of an embodiment of a linear drive device to which the present invention is applied.
Figure 2:
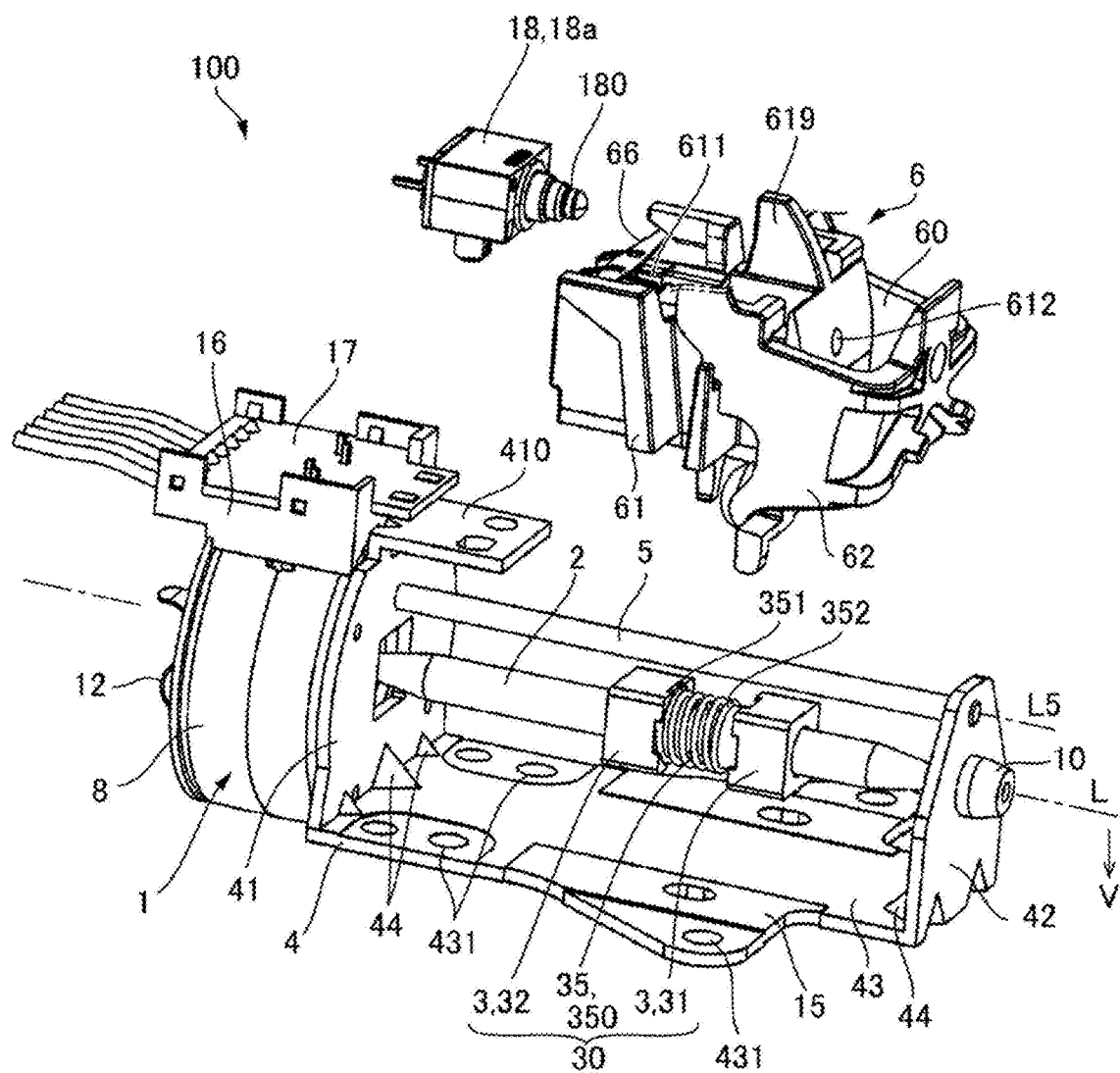
FIG. 2 is an exploded perspective view illustrating a state in which a movable member and a switch are removed from the linear drive device illustrated in FIG. 1.
Figure 3:
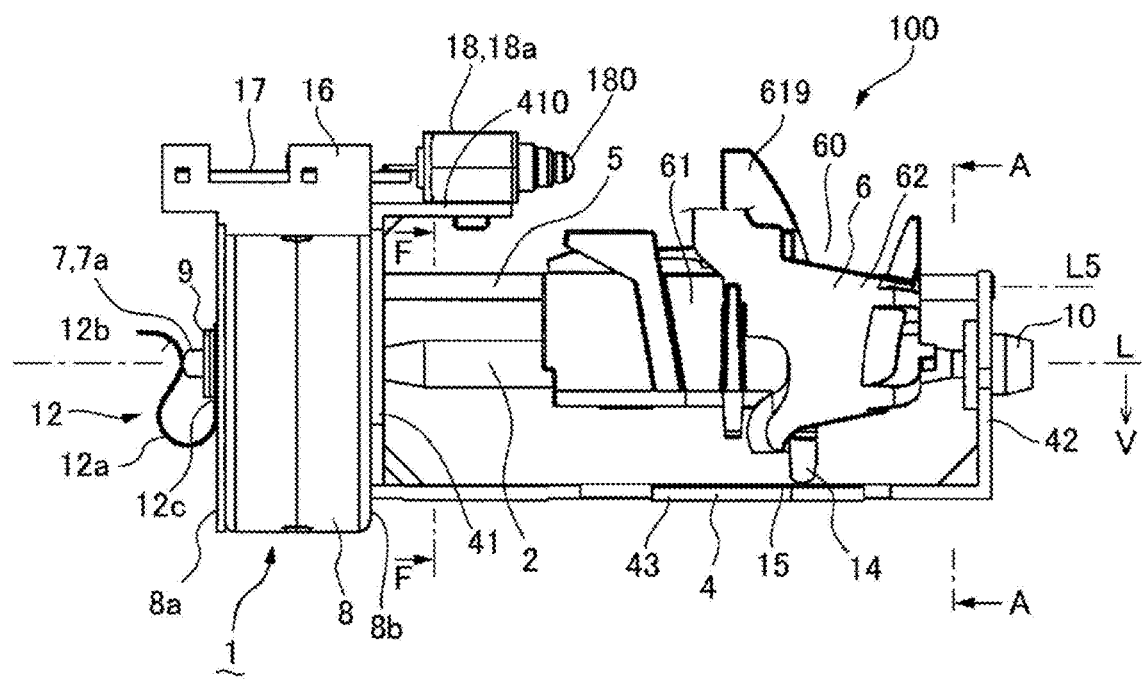
FIG. 3 is a front view illustrating an embodiment of a linear drive device according to the present invention.
Figure 4:
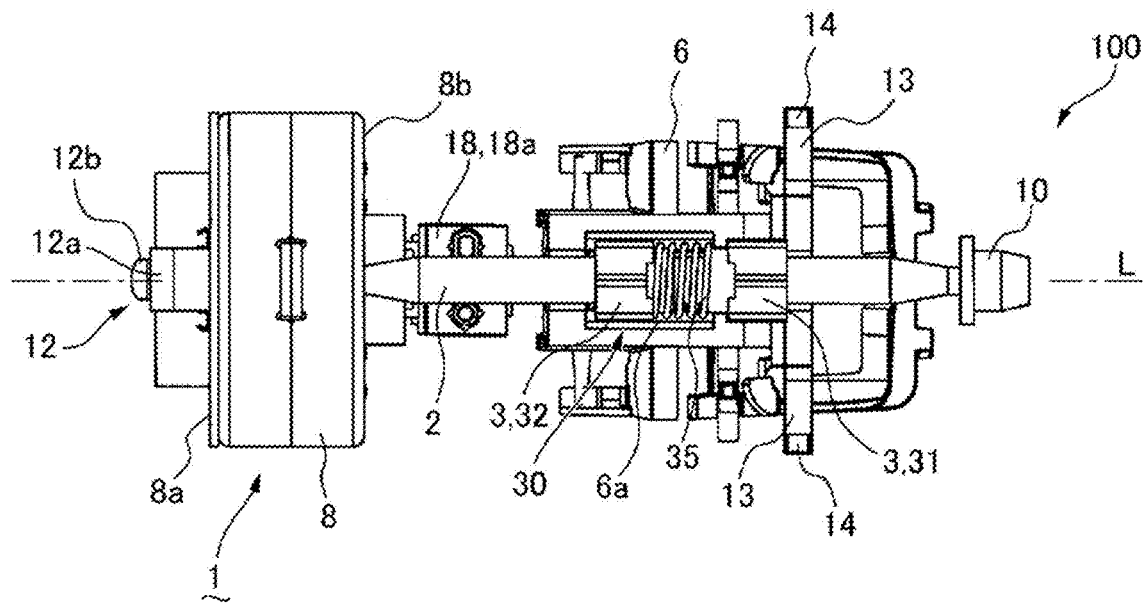
FIG. 4 is a bottom view of the linear drive device when the bracket illustrated in FIG. 3 is removed.

FIG. 1 is a perspective view of an embodiment of a linear drive device 100 of the present invention. FIG. 2 is an exploded perspective view in a state in which a movable member 6 and a switch 18 are removed from the linear drive device 100 illustrated in FIG. 1. FIG. 3 is a front view illustrating an embodiment of the linear drive device according to the present invention. FIG. 4 is a bottom view of the linear drive device 100 when a bracket illustrated in FIG. 3 is removed.

The linear drive device 100 illustrated in FIGS. 1 to 4 schematically includes a lead screw 2 rotatably driven by a motor (stepping motor in the embodiment) 1, a nut portion 3 (a first nut portion 31 and a second nut portion 32) constituting a feed screw mechanism by meshing with the lead screw 2, a guide shaft 5 disposed parallel to the lead screw 2 and having both end portions supported by a bracket 4, and a movable member 6 provided movably on the guide shaft 5. A nut accommodating portion 6a into which the lead screw 2 is inserted and that non-rotatably accommodates the nut portion 3 (the first nut portion 31 and the second nut portion 32) is formed in the movable member 6. Further, a shaft hole 612 through which the guide shaft 5 passes is formed in the movable member 6. The two nut portions 3 (the first nut portion 31 and the second nut portion 32) constitute a nut mechanism 30 together with a first spring 35 disposed between the first nut portion 31 and the second nut portion 32. Although not illustrated, a rotor magnet is rotatably provided in the motor 1 through a gap within an excitation coil fixed in a casing 8, and an output shaft 7 is fixed to a center of the rotor magnet.

In the motor 1, one end portion (opposite output side end portion) of the output shaft 7 is inserted into a bearing 9 provided on a one end surface 8a (opposite output side end surface) side of the casing 8, and a rear end portion 7a is rotatably supported in a state of projecting from the casing 8. The lead screw 2 is coaxially formed on an outer circumferential surface on the distal end (the other end) side of the output shaft 7 of the motor 1. Therefore, the lead screw 2 rotates integrally with the output shaft 7. Therefore, the movable member 6 can be linearly driven by the motor 1 via the nut portion 3 (nut mechanism 30).

The bracket 4 is formed by bending a flat plate member, and includes a first plate portion 41 fixed to the other end surface 8b (output side end surface) located on the lead screw 2 side of the casing 8 of the motor 1, a second plate portion 42 facing the first plate portion 41 on the distal end side of the lead screw 2, and a third plate portion 43 connecting the first plate portion 41 to the second plate portion 42. A bearing 10 for rotatably supporting the distal end side of the lead screw 2 is held in the second plate portion 42. Attachment holes 431 for attaching the linear drive device 100 to a device body are formed at both side end portions of the third plate portion 43.

The first spring 35 that biases the second nut portion 32 in the axial direction is provided between the second nut portion 32 accommodated in the nut accommodating portion 6a and an inner wall of the nut accommodating portion 6a, and occurrence of an error due to backlash between the lead screw 2 and the second nut portion 32 is prevented by the first spring 35.

(Configuration of Buffering Arm Portion 13 or the Like)

Figure 5:
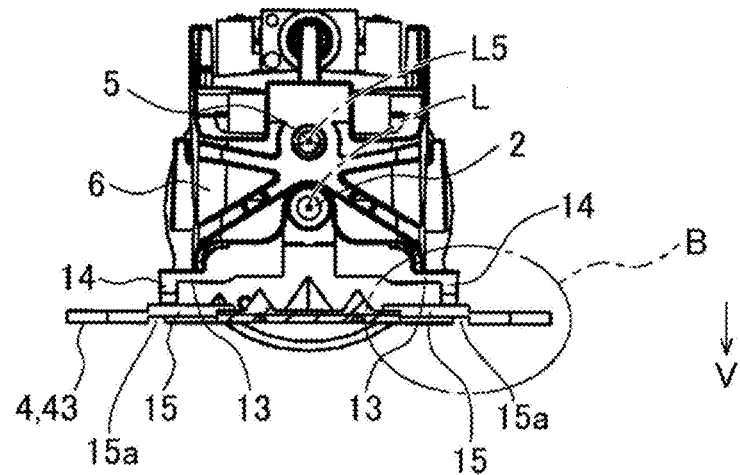
FIG. 5 is an illustrative view when the linear drive device is viewed at a position indicated by a line A-A in FIG. 3.
Figure 6:
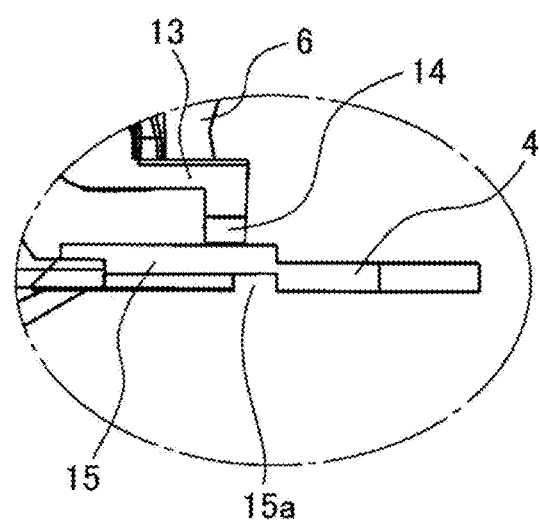
FIG. 6 is an enlarged view of a portion B in FIG. 5.

FIG. 5 is an illustrative view when the linear drive device 100 is viewed at a position indicated by a line A-A in FIG. 3. FIG. 6 is an enlarged view of a portion B in FIG. 5. As illustrated in FIGS. 5 and 6, a pair of buffering arm portions 13 facing parallel to the plate surface of the third plate portion 43 of the bracket 4 in a direction orthogonal to the axis L of the lead screw 2, and a leg portion 14 that is bent toward the plate surface side of the third plate portion 43 of the bracket 4 from the distal ends of the respective buffering arm portions 13 in the pair so that a distal end abuts against the plate surface of the third plate portion 43 of the bracket 4 are integrally formed in both side portions of the movable member 6. The buffering arm portion 13 is formed with a length dimension in which the leg portion 14 is located on the outer side relative to both side portions of the movable member 6, and has flexibility.

The third plate portion 43 is half-punched so that a portion 15 in a range in which a distal end of the leg portion 14 abuts projects to the leg portion 14 (upper surface side). Therefore, in the third plate portion 43, a bottom portion on the back side of the portion 15 in which the distal end of the leg portion 14 abuts is a flat concave portion 15a. A half-punching process is well-known sheet metal processing in which a die having an opening corresponding to the portion 15 formed therein is disposed on the upper surface side of the bracket 4, a rectangular punch corresponding to the portion 15 is disposed on the lower surface side, and the portion 15 is pressed against the upper surface side to be deformed by the punch. In the embodiment, a mold is also disposed on the upper surface side corresponding to the portion 15, and the half-punching process is performed with the portion 15 sandwiched between the mold and the punch.

According to the linear drive device 100 having such a configuration, a buffering arm portion 13 extending in a direction orthogonal to the axis in parallel to the plate surface of the bracket 4 and projecting to the outer side of the bracket 4, and a leg portion which is bent toward the plate surface side of the bracket 4 from the distal end of the shock absorbing arm portion 13 and has a distal end abutting against the plate surface of the bracket 4 are integrally formed in both side portions in the moving direction of the movable member 6. Therefore, even when a rotational force acts on the movable member 6, for example, at the time of starting or reversing the motor, the leg portion 14 abuts against the plate surface of the bracket 4, such that the amount of rotation (rotation angle) is suppressed to be small.

In addition, the buffering arm portion 13 parallel to the plate surface of the bracket 4 is provided between the leg portions 14 of the movable member 6. Therefore, when the leg portion 14 abuts against the plate surface of the bracket 4, the buffering arm portion 13 is bent and absorbs shock, and therefore, it is also possible to prevent abnormal noise from being generated. Furthermore, since the half-punching process for projection to the leg portion 14 side (the upper surface side of the bracket 4) is performed on the portion 15 in a range in which the distal end of the leg portion 14 of the plate surface of the bracket 4 abuts, it is possible to improve flatness of the portion 15. Therefore, it is possible to ensure stable traveling without causing the movable member 6 to shake up and down.

It should be noted that, although the buffering arm portion 13 extends in a direction orthogonal to the axis and parallel to the plate surface of the bracket 4, an aspect in which the buffering arm portion 13 extends in direction in which the buffering arm portion 13 is gradually spaced apart from the third plate portion 43 toward the distal end side and projects to the outer side of the bracket 4 may be adopted. That is, the buffering arm portion 13 may be inclined toward the plate surface side of the third plate portion 43 of the bracket 4, and may extend in a direction intersecting the axis L. Further, the buffering arm portion 13 may be curved, and includes the buffering arm portion 13 having elasticity and the leg portion 14 abutting against the plate surface of the bracket 4 from the buffering arm portion 13. The buffering arm portion 13 may have a shape that is deformed when the leg portion 14 abuts against the plate surface and has a shape having elastic force.

(Configuration of second spring 12)

Figure 7A:
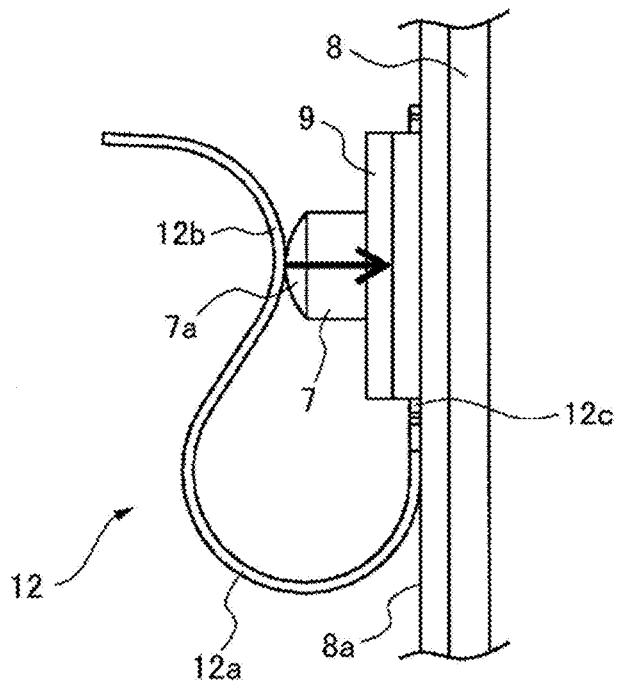
FIG. 7(a) and FIG. 7(b) are illustrative views of a second spring illustrated in FIG. 1.
Figure 7B:
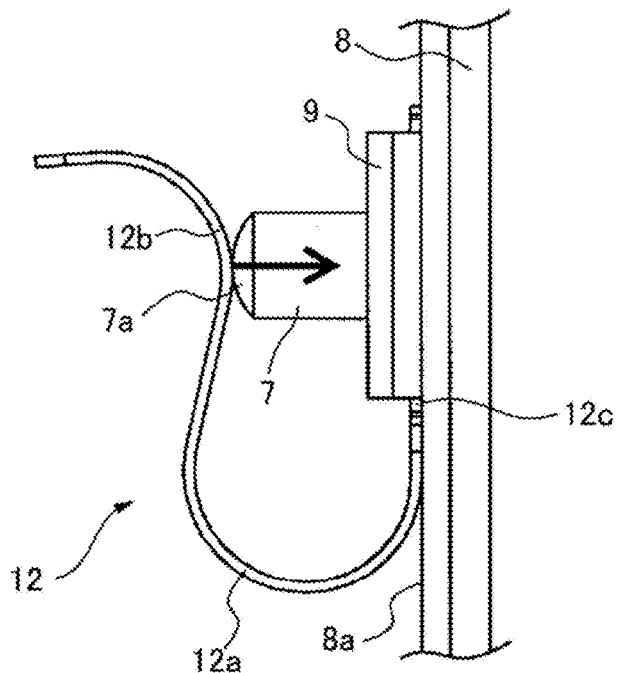
Figure 8A:
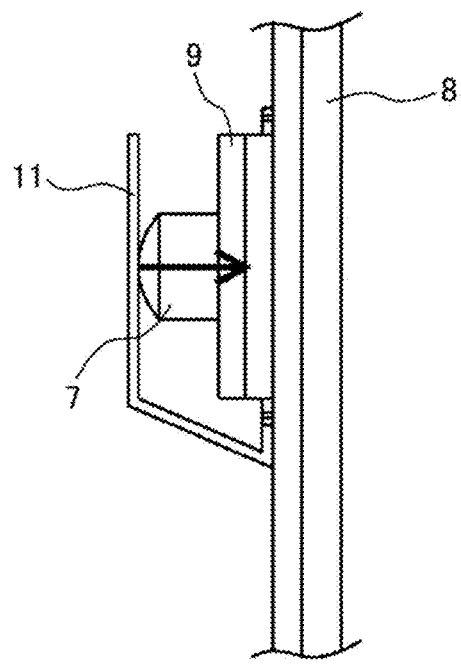
FIG. 8(a) and FIG. 8(b) are illustrative views of a second spring different from the second spring illustrated in FIG. 7(a) and FIG. 7(b).
Figure 8B:
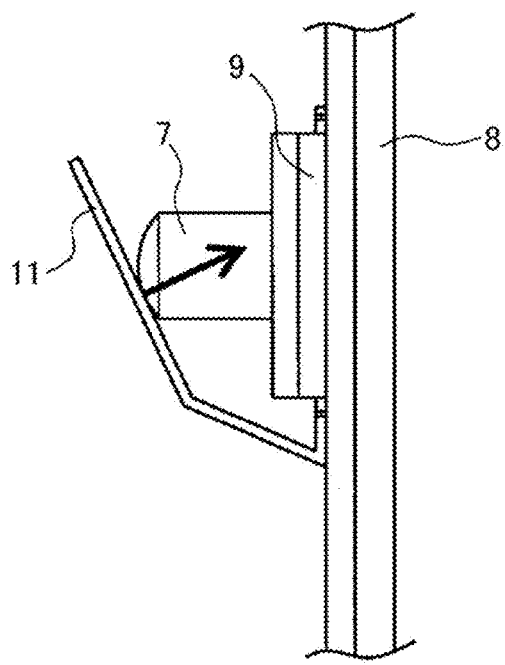

FIG. 7(a) and FIG. 7(b) are illustrative views of the second spring 12 illustrated in FIG. 1, FIG. 7(a) is an enlarged view of an attachment portion of the second spring 12, and FIG. 7(b) is an enlarged view when a position of the same output shaft 7 is changed. FIG. 8(a) and FIG. 8(b) are illustrative views of the second spring 11 different from the second spring 12 illustrated in FIG. 7(a) and FIG. 7(b), FIG. 8(a) is an enlarged view of the attaching portion of the second spring 11, and FIG. 8(b) is an enlarged view when the position of the same output shaft 7 also changes.

As illustrated in FIG. 7(a), a second spring 12 for biasing the output shaft 7 (the lead screw 2) in a direction of the axis L toward the bearing 10 side of the bracket 4 is provided between the one end surface 8a of the casing 8 of the motor 1 and the rear end portion 7a of the output shaft 7. That is, when a moving direction of the movable member 6 is switched by reversing the motor 1, a time lag occurs in the movement of the movable member 6 due to a gap between the thread ridges of the lead screw 2 and the nut portion 3 and an error occurs, and therefore, the second spring 12 that presses the output shaft 7 in the direction of the axis L is provided on the one end surface 8a of the casing 8 of the motor 1, thereby suppressing a positional deviation in the direction of the axis L due to external force such as rattling and vibration caused between the threads of the lead screw 2 and reducing an error at the time of an operation.

In the embodiment, the second spring 12 includes a fixed portion 12c fixed to the one end surface 8a of the casing 8, a biasing portion 12a that extends from the fixed portion 12c toward the one end side from the rear end portion 7a of the output shaft 7 and biases the output shaft 7 to the other end side, and a pressing portion 12b that abuts against the rear end portion 7a of the output shaft 7 from the biasing portion 12a. In the second spring 12, the fixed portion 12c and the biasing portion 12a have a constant plate width, but a plate width of the pressing portion 12b is smaller than a plate width of the fixed portion 12c and the biasing portion 12a. Further, the plate width of the pressing portion 12b is greater than the rear end portion 7a of the output shaft 7. In the embodiment, the second spring 12 is formed by bending a leaf spring, in which the fixed portion 12c being sandwiched and fixed between the bearing 10 and the one end surface 8a of the casing 8 is formed in one end portion, and is formed in an S shape having a biasing portion 12a formed by being bent in a convex circular arc shape in the direction of the axis L from the fixed portion 12c, and a pressing portion 12b formed by being bent in an inverse circular arc shape from the other end portion of the biasing portion 12a.

That is, the second spring 12 includes the fixed portion 12c fixed to the one end surface 8a of the casing 8, the biasing portion 12a that is bent to be spaced apart from the output shaft 7 and extends from the fixed portion 12c to the side in which the rear end portion 7a (the opposite output side end portion) of the output shaft 7 is located, and the pressing portion 12b that extends in a direction in which the pressing portion 12b is spaced apart from the rear end portion 7a while being bent in the direction opposite to the biasing portion 12a so that the pressing portion 12b abuts against the rear end portion 7a from the biasing portion 12a.

Further, in the output shaft 7, the rear end portion 7a projecting to the outer side from the one end surface 8a of the casing 8 is formed with a flat or spherical surface. The second spring 12 is attached in a state in which an outer circumferential surface of the pressing portion 12b abuts against the rear end portion 7a of the output shaft 7 through line contact when the rear end portion 7a is a flat surface and through point contact when the rear end portion 7a is a spherical surface, and the output shaft 7 is pressed in the axial direction by an elastic force of the biasing portion 12a.

In the linear drive device 100 having such a configuration, the rear end portion 7a of the output shaft 7 projecting from the one end surface 8a of the casing 8 to the outer side is formed into a flat surface or a spherical surface, and the pressing portion 12b in an inverse circular arc shape abuts against the rear end portion 7a through line contact by an elastic force of the biasing portion 12a having an arc shape in the second spring 12, thereby constantly pressing the output shaft 7 (the lead screw 2) in the axial direction. Therefore, as illustrated in FIG. 7(b), even when the amount of projection of the output shaft 7 from the one end surface 8a of the casing 8 is different or changes during operation, the output shaft 7 can be constantly pressed in the axial direction.

As a result, it is possible to suppress impediments such as local wear of the bearing 9 due to partial contact with the bearing 9 caused by inclination of the pressing force from the second spring 12 to the output shaft 7 with respect to the axial direction, or generation of noise.

Meanwhile, as in a reference example illustrated in FIG. 8(a), a configuration in which the output shaft 7 is biased by the second spring 11 in a flat plate shape is also conceivable. In this case, when the position of the output shaft 21 is changed as illustrated in FIG. 8(b) due to a manufacturing error of components such as the output shaft 7, the lead screw 2, or the bracket 4, or a movement of the output shaft 7 at the time of reversing the motor 1, a pressing direction of the second spring 11 is inclined with respect to the axis of the output shaft 21. As a result, there is concern that the output shaft 7 constantly partially abuts against the bearing 9, thereby causing service life of the bearing 9 to be shortened due to local wear or the output shaft 7 collides with one side of the bearing 9 when the motor 1 is started or stopped, thereby generating noise. However, according to the second spring 12 described with reference to FIG. 7(a) and FIG. 7(b), it is difficult for the above problem to occur.

It should be noted that although the pressing portion 12b may be formed in an S shape in the embodiment, an abutting portion between the output shaft 7 and the second spring 12 may be only bent (may not be formed in the S shape). In addition, the biasing portion 12a is formed to be bent in the convex circular arc shape, but is not limited thereto and the biasing portion 12a may have a shape having a biasing force to the other end side.

(Configuration of Switch 18)

As illustrated in FIG. 1, a terminal block 16 is formed in a body portion of the motor 1, and a wiring board 17 is fixed to the terminal block 16. A switch 18 that detects approach of the movable member 6 is electrically connected to the wiring board 17. The switch 18 is directly fixed to the bracket 4. More specifically, in the bracket 4, the first plate portion 41 includes a fourth plate portion 410 in which an end portion on the side opposite to the third plate portion 43 is bent toward the second plate portion 42 and extends parallel to the third plate portion 43, and the switch 18 is fixed to the fourth plate portion 410. Here, the switch 18 is a contact type switch 18a that detects the movable member 6 according to the contact of the movable member 6, and a contact portion 180 faces the movable member 6.

In the linear drive device 100 configured as described above, since the movable member 6 is driven using the guide shaft 5 and the lead screw 2 supported by the common bracket 4, it is difficult for rattling to occur when the movable member 6 is driven. Further, since the switch 18 is fixed to the bracket 4, the switch 18 can be disposed at an appropriate position with reference to the bracket 4. Therefore, it is possible to accurately detect approach of the movable member 6 to the motor 1 and the first plate portion 41. Particularly, since the switch 18 is the contact type switch 18a that detects the movable member 6 according to the contact of the movable member 6, effects of disposition of the switch 18 at an appropriate position with reference to the bracket 4 are significant.

(Configuration of Movable Member 6)

Figure 9:
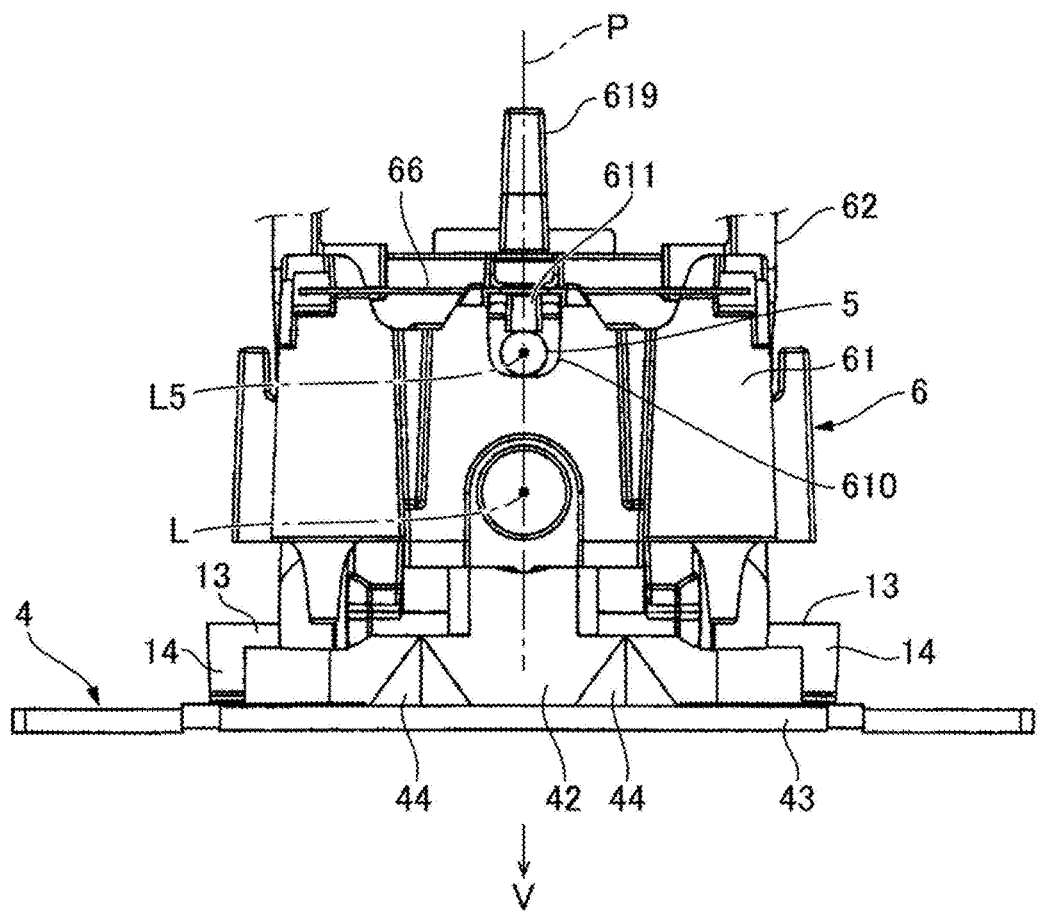
FIG. 9 is an illustrative view when the linear drive device is viewed at a position indicated by a line F-F in FIG. 3.

FIG. 9 is an illustrative view when the linear drive device 100 is viewed at a position indicated by a line F-F in FIG. 3. In FIG. 2, the movable member 6 includes a slider 61 (a slide plate) that supports the nut mechanism 30 illustrated in FIG. 2, and a cover 62 connected to the slider 61. A concave mounting portion 60 in which a driven member (not illustrated) is disposed inside is formed between the slider 61 and the cover 62 in a state in which the slider 61 and the cover 62 are connected to each other, and a load of the driven member is applied to an inner surface located in a direction of the axis L of the mounting portion 60. A plate portion 619 that abuts against the contact portion 180 of the switch 18 (the contact type switch 18a) when the movable member 6 approaches the motor 1 and the first plate portion 41 is formed in the slider 61. An end portion of the plate portion 619 on the side in which the mounting portion 60 is located is inclined in obliquely upward direction and is configured to avoid interference with the driven member mounted in the mounting portion 60. Therefore, it is easy to dispose the driven member in a state in which the driven member is inclined obliquely along a surface on which the motor 1 is located with respect to the mounting portion 60. In this case, the driven member causes a load to be generated on the motor 1 side in the mounting portion 60.

As illustrated in FIG. 9, the lead screw 2 and the guide shaft 5 are disposed at positions overlapping in a vertical direction V. Further, in the movable member 6, a center of the mounting portion 60 overlaps the lead screw 2 and the guide shaft 5 in the vertical direction V. In the embodiment, the guide shaft 5 is disposed at a position right above the lead screw 2, and the slider 61 and the cover 62 are respectively formed with plane symmetry with respect to a virtual plane P defined by a center axis (axis L) of the lead screw 2 and a center axis L5 of the guide shaft 5. Therefore, the movable member 6 is formed with plane symmetry with respect to the virtual plane P.

Therefore, a load of the movable member 6 and the driven member is appropriately applied to the guide shaft 5 and the lead screw 2 to be along the virtual plane P. Therefore, it is possible to stably drive the movable member 6 and the driven member, and to appropriately reduce rattling.

(Configuration of Nut Mechanism 30)

Figure 10:
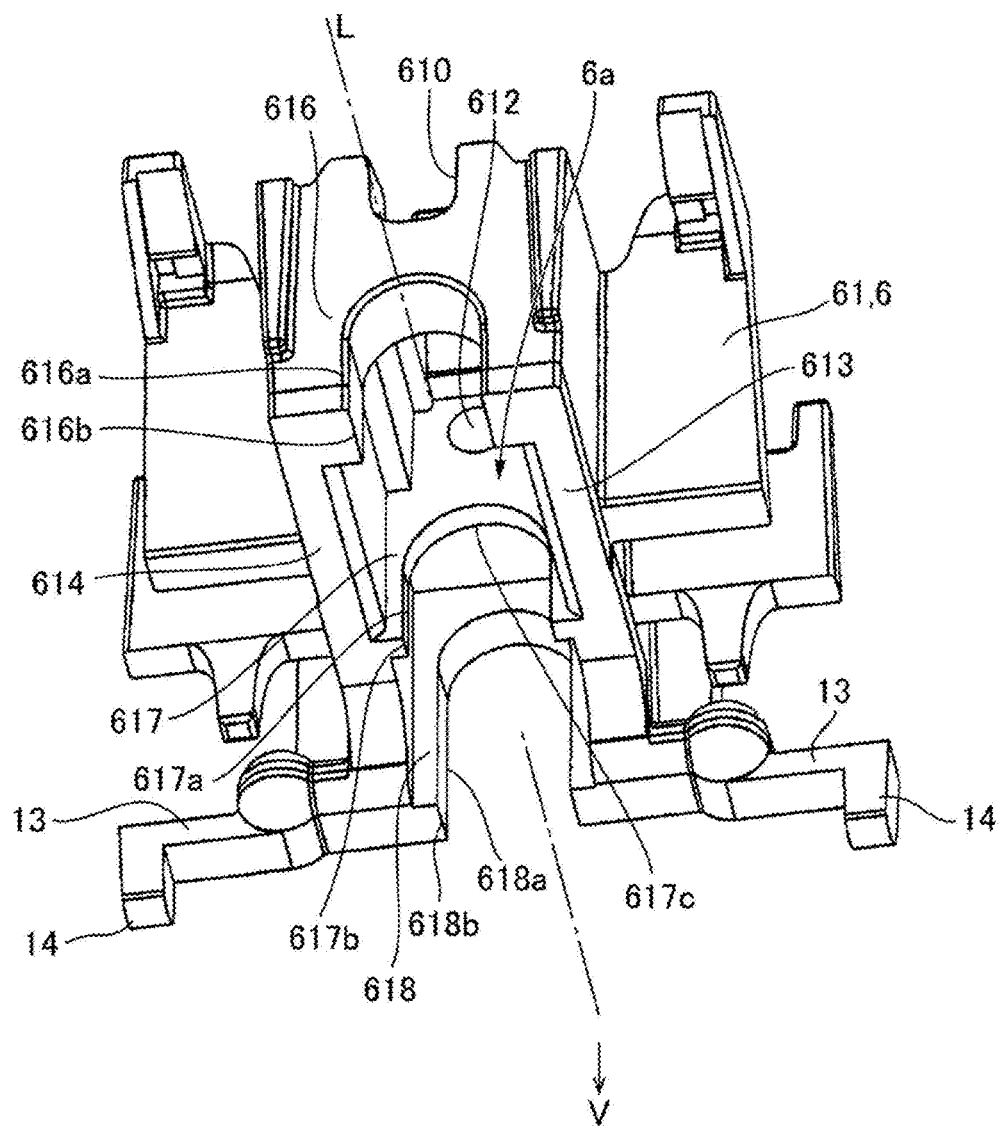
FIG. 10 is a perspective view when a slider of the movable member illustrated in FIG. 2 is viewed in an obliquely downward direction and from the first plate portion side.
Figure 11:
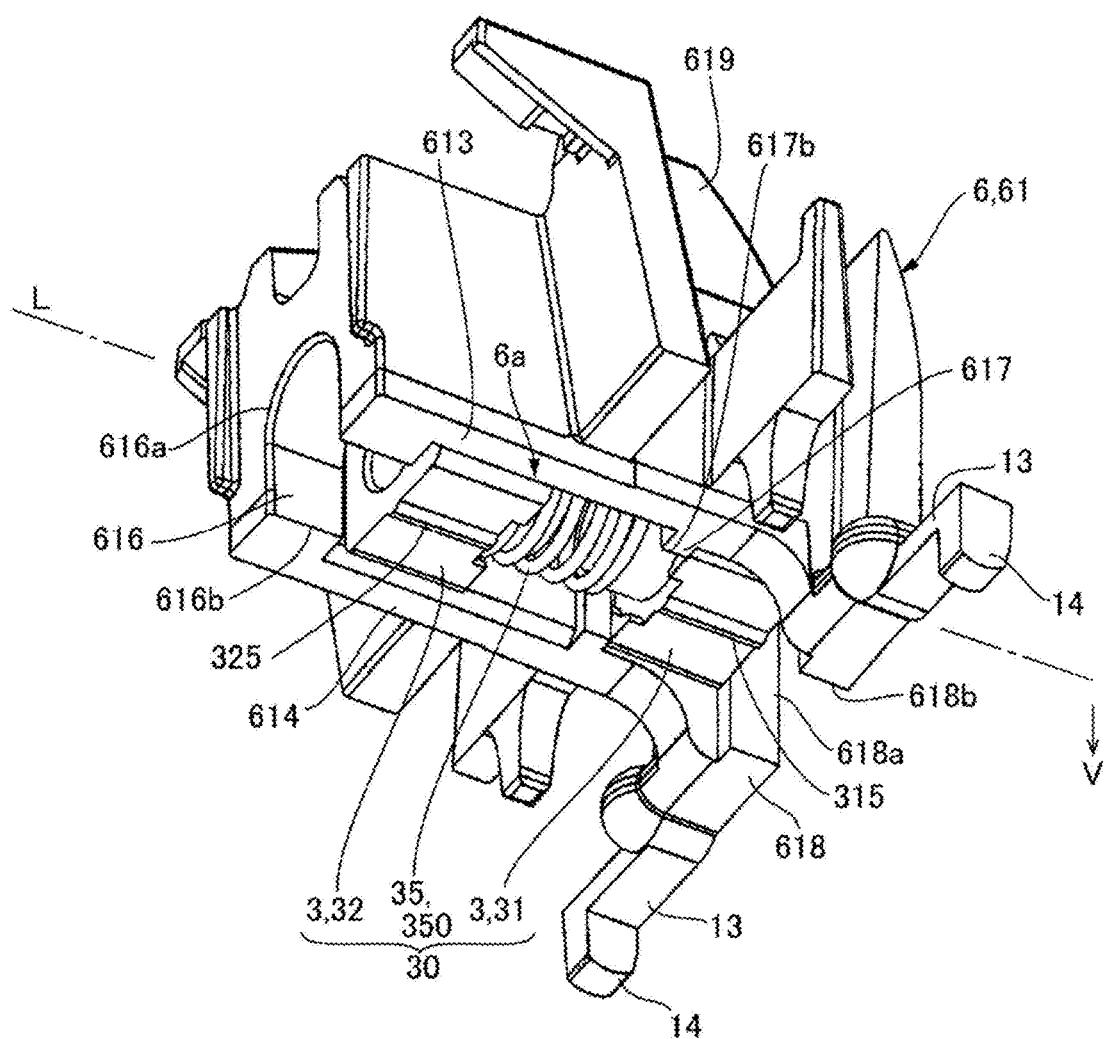
FIG. 11 is a perspective view when a state in which the nut mechanism illustrated in FIG. 2 is attached to the slider of a movable member is viewed in an obliquely downward direction and from the first plate portion side.
Figure 12:
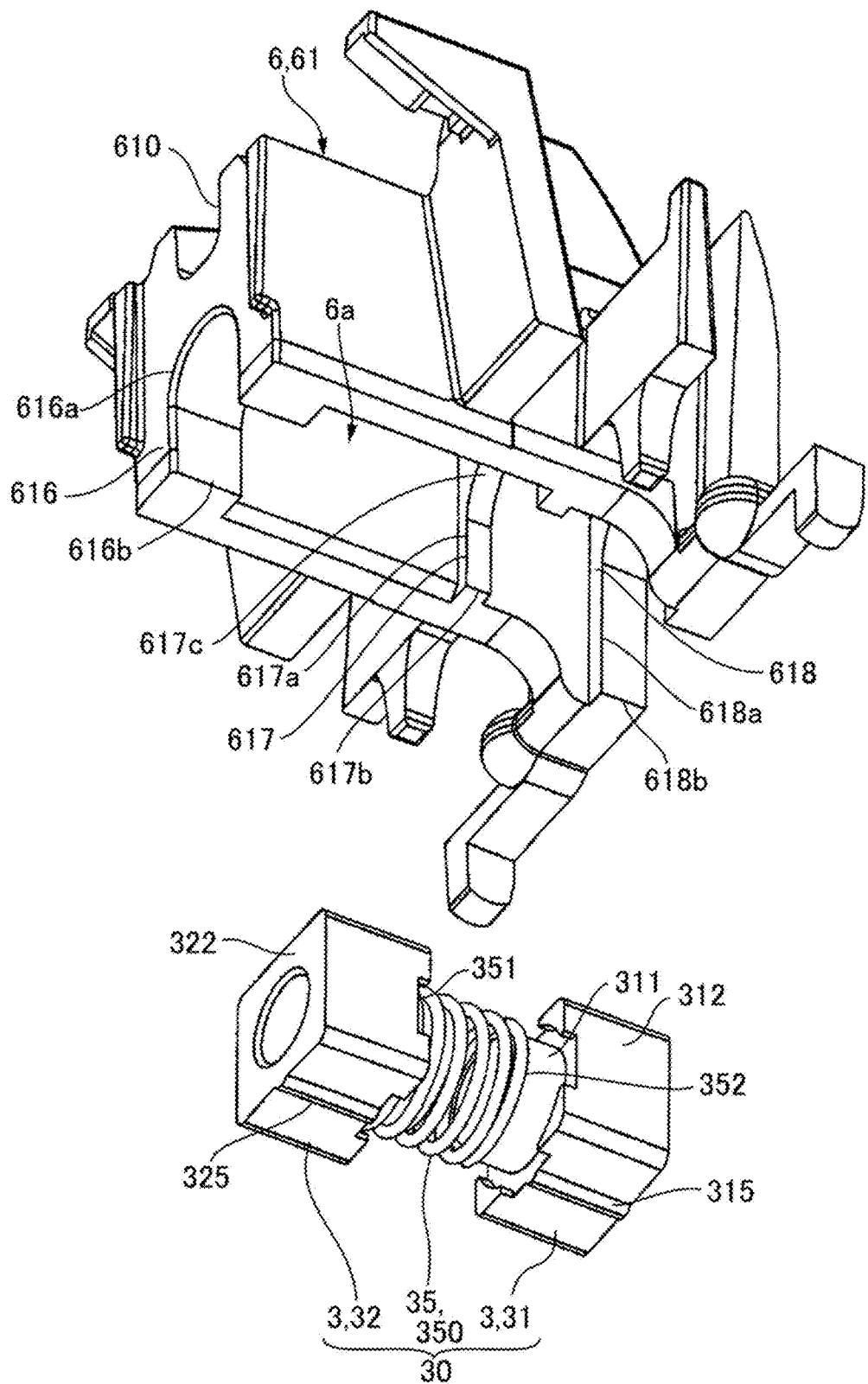
FIG. 12 is an exploded perspective view of a state in which the nut mechanism is removed from the state illustrated in FIG. 11.
Figure 13:
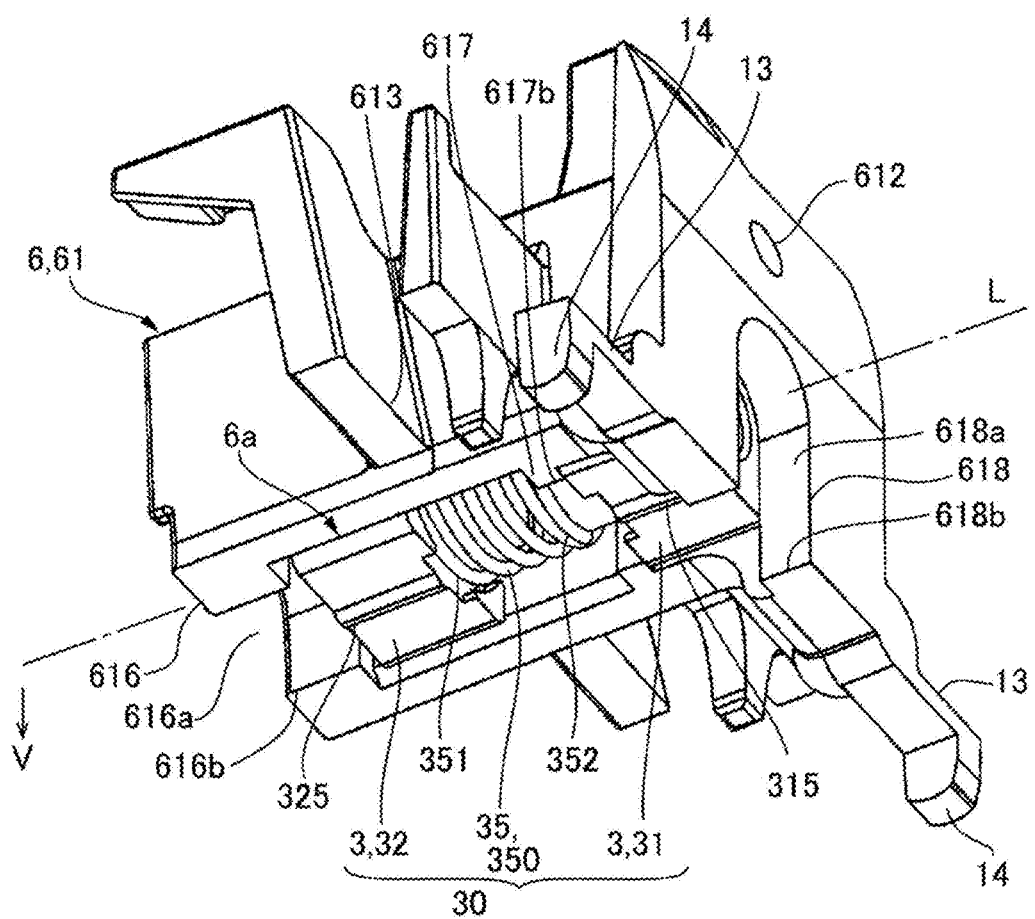
FIG. 13 is a perspective view in which a state in which the nut mechanism illustrated in FIG. 2 is attached to the slider of the movable member is viewed in an obliquely downward direction and from the second plate portion side.
Figure 14:
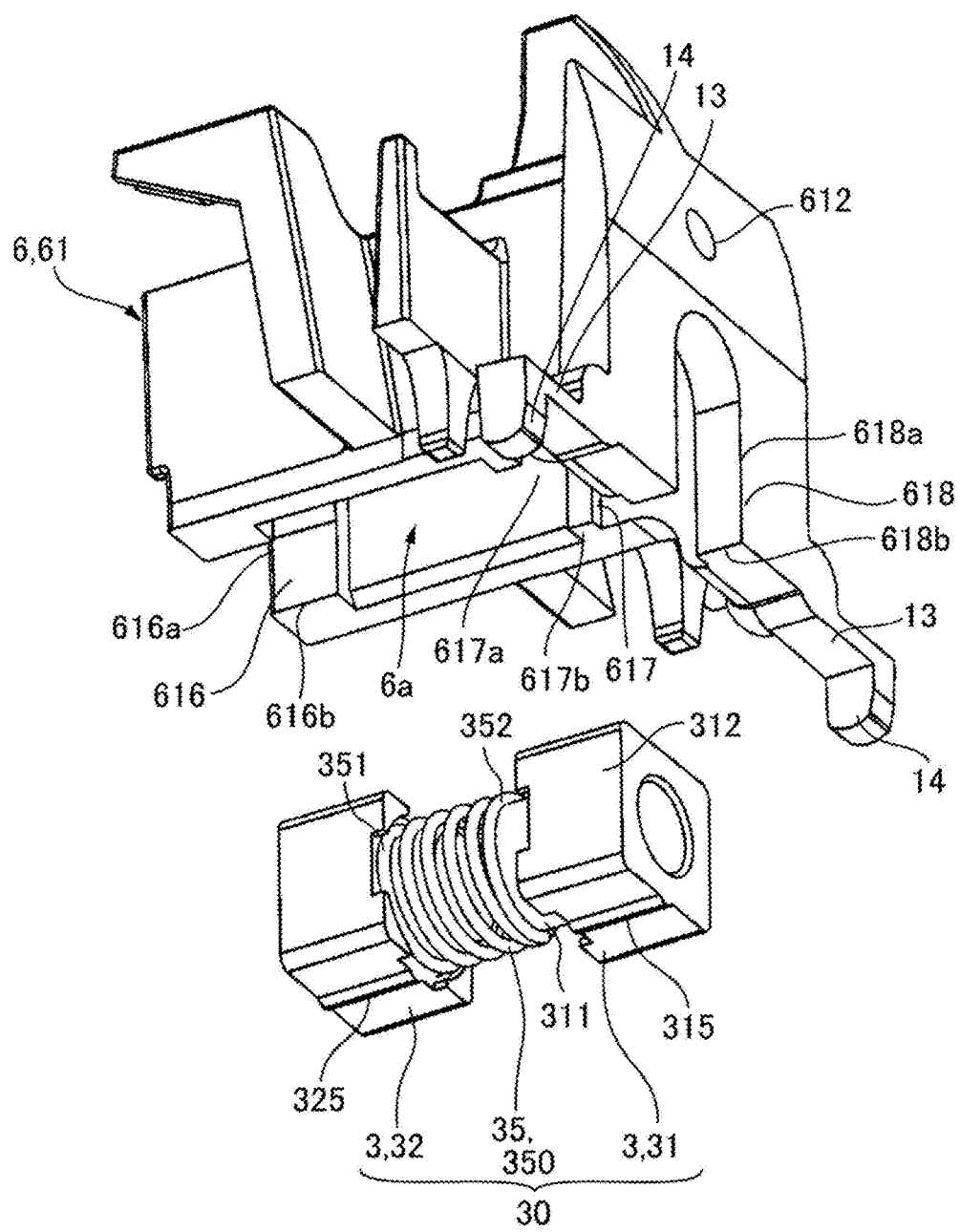
FIG. 14 is an exploded perspective view of a state in which the nut mechanism is removed from the state illustrated in FIG. 13.

FIG. 10 is a perspective view when the slider 61 of the movable member 6 illustrated in FIG. 2 is viewed in an obliquely downward direction and from the first plate portion 41 side. FIG. 11 is a perspective view when a state in which the nut mechanism 30 illustrated in FIG. 2 is attached to the slider 61 of the movable member 6 is viewed in an obliquely downward direction and from the first plate portion 41 side. FIG. 12 is an exploded perspective view in a state in which the nut mechanism 30 is removed from the state illustrated in FIG. 11. FIG. 13 is a perspective view when a state in which the nut mechanism 30 illustrated in FIG. 2 is attached to the slider 61 of the movable member 6 is viewed in an obliquely downward direction and from the second plate portion 42 side. FIG. 14 is an exploded perspective view in a state in which the nut mechanism 30 is removed from the state illustrated in FIG. 13.

As illustrated in FIG. 10, in the slider 61, in the nut accommodating portion 6a in which the nut mechanism 30 is accommodated, three plate portions (a first support plate portion 616, a second support plate portion 617, and a third support plate portion 618) are sequentially formed to the side in which the second plate portion 42 is located from the side in which the first plate portion 41 of the bracket 4 is located, between side walls 613 and 614 facing each other, and a space partitioned by the first support plate portion 616, the second support plate portion 617, and the third support plate portion 618 is a space in which each of the two nut portions 3 is disposed. Opening portions 616a, 617a, and 618a through which the lead screw 2 passes are formed in the first support plate portion 616, the second support plate portion 617, and the third support plate portion 618.

In this embodiment, the first nut portion 31 is disposed between the second support plate portion 617 and the third support plate portion 618, as illustrated in FIGS. 10, 11, 12, 13, and 14. Further, the second nut portion 32 is disposed between the first support plate portion 616 and the second support plate portion 617. Here, an interval between the side walls 613 and 614 is substantially equal to a width dimension of the first nut portion 31 and the second nut portion 32. Therefore, when the movable member 6 rotates around the axis L, both of the first nut portion 31 and the second nut portion 32 abut against the side walls 613 and 614. Therefore, both the first nut portion 31 and the second nut portion 32 are not rotatable in the circumferential direction with respect to the movable member 6.

An interval between the second support plate portion 617 and the third support plate portion 618 is substantially equal to a dimension in the direction of the axis L of the first nut portion 31. Therefore, the first nut portion 31 is disposed in the nut accommodating portion 6a of the movable member 6 not to be relatively movable in the direction of the axis L with respect to the movable member 6. On the other hand, an interval between the first support plate portion 616 and the second support plate portion 617 is sufficiently greater than the dimension in the direction of the axis L of the second nut portion 32. Therefore, the second nut portion 32 is disposed in the nut accommodating portion 6a of the movable member 6 to be relatively movable in the direction of the axis L with respect to the movable member 6. The first spring 35 is disposed between the second nut portion 32 and the second support plate portion 617, and the second nut portion 32 is biased in the direction of the axis L by the first spring 35.

In the embodiment, the first spring 35 is a coil spring 350 disposed in a compressed state, and the lead screw 2 passes through the inside of the first spring 35. In the coil spring 350, a first end portion 351 on the second nut portion 32 side abuts against the second nut portion 32, and a second end portion 352 on the first nut portion 31 side abuts against the second support plate portion 617. Accordingly, the second nut portion 32 is biased toward the first plate portion 41 (a direction being spaced apart from the first nut portion 31) in the direction of the axis L.

Therefore, it is possible to suppress rattling between the male threads of the lead screw 2 and the female threads of the nut portion 3 (the first nut portion 31 and the second nut portion 32). Further, in the embodiment, the first nut portion 31 provided on the side opposite to the motor 1 and the first plate portion 41 among the first nut portion 31 and the second nut portion 32 is not relatively movable with respect to the slider 61 of the movable member 6. Therefore, when the driven member is mounted on the movable member 6, the driven member is mounted at a position biased to the side opposite to the motor 1 and the first plate portion 41. Therefore, when the movable member 6 is driven in a direction approaching the motor 1 and the first plate portion 41, it is difficult for the driven member to interfere with the motor 1, the first plate portion 41, and members disposed around the motor 1 and the first plate portion 41. Thus, even when the rattling is reduced by using the two nut portions 3, it is possible to widen a movable range of the movable member 6.

Further, in the embodiment, when the driven member is mounted on the mounting portion 60, the driven member applies a load to the motor 1 side in the mounting portion 60. Further, the first spring 35 biases the second nut portion 32 toward the motor 1. With this configuration, in the embodiment, a structure in which the first nut portion 31 provided on the side opposite to the motor 1 and the first plate portion 41 is not relatively movable with respect to the slider 61 of the movable member 6 is adopted. Therefore, even when the movable member 6 is driven to the motor 1 side, the load of the driven member is applied in a direction for reducing a biasing force of the first spring 35, and therefore, a thrust of the motor 1 may be small. Thus, a difference in the thrust required for the motor 1 can be reduced when the movable member 6 is driven to the motor 1 side and when the movable member 6 is driven to the side opposite to the motor 1.

Marks 315 and 325 that align the angular positions of the first nut portion 31 and the second nut portion 32 are provided in the first nut portion 31 and the second nut portion 32, respectively. In this embodiment, the marks 315 and 325 are projecting ridge portions extending in the direction of the axis L on a surface facing the third plate portion 43 in the first nut portion 31 and the second nut portion 32. According to such a configuration, the angular positions of the first nut portion 31 and the second nut portion 32 can be accurately aligned using the marks 315 and 325. Therefore, even when the pitch of the male threads of the lead screw 2 (the pitch of the female threads of the nut portion 3) is enlarged, the first nut portion 31 and the second nut portion 32 can be disposed in an appropriate phase with respect to the lead screw 2. In addition, since the marks 315 and 325 are projecting ridge portions extending in the direction of the axis L, it is easy to visually confirm the marks 315 and 325 and it is possible to suppress occurrence of a situation of wrong assembling.

(Detailed Configuration of Nut Mechanism 30 or the Like)

Figure 15:
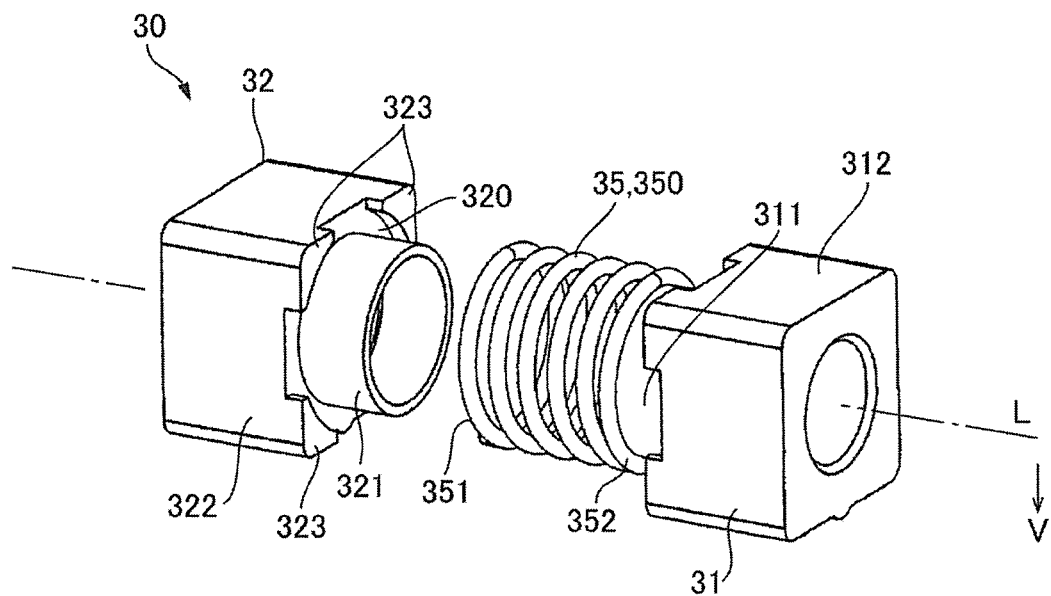
FIG. 15 is an exploded perspective view of the nut mechanism illustrated in FIG. 2.
Figure 16:
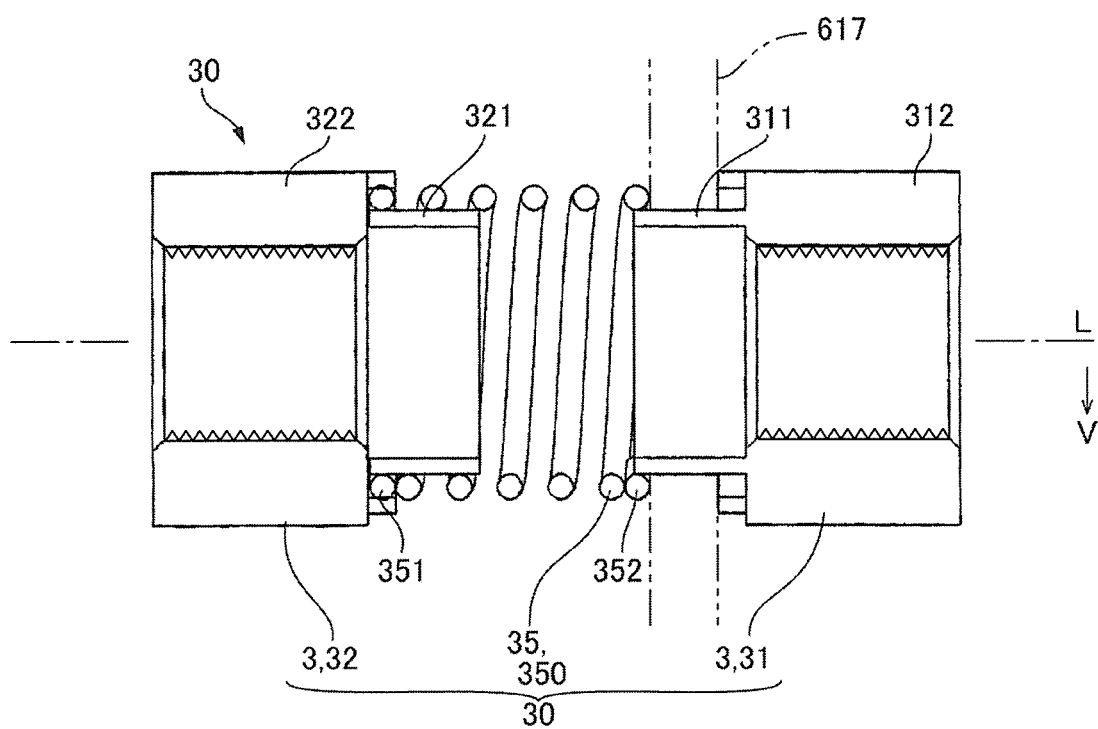
FIG. 16 is a cross-sectional view of the nut mechanism illustrated in FIG. 2.

FIG. 15 is an exploded perspective view of the nut mechanism 30 illustrated in FIG. 2. FIG. 16 is a cross-sectional view of the nut mechanism 30 illustrated in FIG. 2. As illustrated in FIGS. 15 and 16, in the nut mechanism 30, the first nut portion 31 and the second nut portion 32 respectively includes cylindrical portions 311 and 321 in which female threads meshing with the lead screw 2 are formed on an inner circumferential surface, and angular flange portions 312 and 322 formed at the end portions of the cylindrical portions 311 and 321 on the side opposite to the coil spring 350.

Here, in the second nut portion 32, a groove-like concave portion 320 in which the first end portion 351 of the coil spring 350 on the second nut portion 32 side is accommodated is formed on a surface of the flange portion 322 on the side of the coil spring 350. In this embodiment, the flange portion 322 is polygonal when viewed in the direction of the axis L, and a projecting portion 323 projecting in the direction of the axis L from the flange portion 322 is formed around the cylindrical portion 321 at each corner portion. Therefore, a groove-like concave portion 320 in an arc-shape when viewed in the direction of the axis L is formed between the cylindrical portion 321 and the projecting portion 323 in each corner portion of the flange portion 322. In the embodiment, the groove-like concave portion 320 has a depth equal to or greater than ½ of a diameter of a wire member constituting the coil spring 350. In the example illustrated in FIG. 16, the depth of the groove-like concave portion 320 is substantially the same as the diameter of the wire material constituting the coil spring 350. In the embodiment, the first nut portion 31 and the second nut portion 32 are formed by disposing the nut portions 3 having the same configuration in opposite directions in the direction of the axis L.

According to such a configuration, it is possible to prevent the first end portion 351 of the coil spring 350 from becoming disengaged from the second nut portion 32. Here, the flange portion 322 is a quadrangle when viewed in the direction of the axis L, and a groove-like concave portion 320 is formed in each of four corner portions. Thus, by using the projecting portions 323 provided at the corner portions, it is possible to miniaturize the second nut portion 32 even when the groove-like concave portion 320 has been formed.

The groove-like concave portions 320 may not be provided at all corners as long as the groove-like concave portions 320 are provided at a plurality of places spaced apart in a circumferential direction. However, from the viewpoint of appropriately holding the first end portion 351 of the coil spring 350, it is preferable for groove-like concave portions 320 to be provided at least at two diagonally located corner portions or at two places that are greatly spaced apart from each other in the circumferential direction. In addition, the groove-like concave portion 320 may be provided at the entire circumference.

In this embodiment, in correspondence with the above configuration of the nut portion 3, the opening portion 617a formed in the second support plate portion 617 interposed between the coil spring 350 and the first nut portion 31 among the three plate portions is a notch directed to an open end 617b in the direction orthogonal to the direction of the axis L, and a cylindrical portion 311 of the first nut portion 31 is located inside the notch, as illustrated in FIG. 10.

Here, an inner circumferential surface 617c of the notch-like opening portion 617a located on the side opposite to the open end 617b side is a circular arc surface that is bent along the outer circumferential surface of the cylindrical portion 311 of the first nut portion 31 and abuts against the cylindrical portion 311 of the first nut portion 31. Therefore, even when the second end portion 352 of the coil spring 350 is supported by the second support plate portion 617 of the movable member 6, the second end portion 352 of the coil spring 350 can be supported by the movable member 6 over a wide range in the circumferential direction.

In this embodiment, the opening portions 616a and 618a formed in the first support plate portion 616 and the third support plate portion 618 are also notches directed to the open ends 616b and 618b in the direction orthogonal to the direction of the axis L. The open ends 616b, 617b, and 618b are all directed in the same direction, and in this embodiment, the open ends 616b, 617b, and 618b are directed to the side in which the third plate portion 43 is located.

(Support Structure for Guide Shaft 5)

Figure 17:
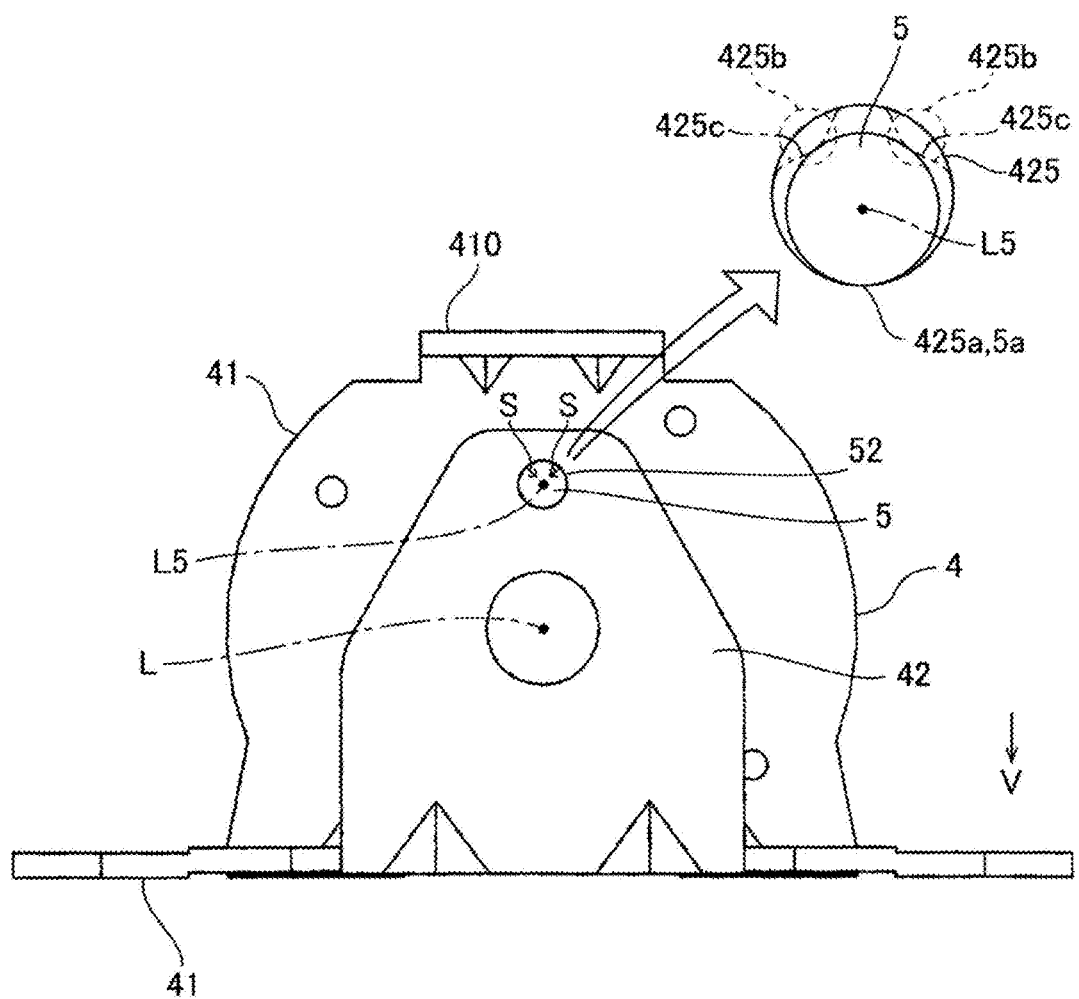
FIG. 17 is an illustrative view illustrating a fixing structure of a guide shaft in the linear drive device illustrated in FIG. 1.

FIG. 17 is an illustrative view illustrating a fixing structure of the guide shaft 5 in the linear drive device 100 illustrated in FIG. 1, and FIG. 17 illustrates a method of fixing the guide shaft 5 to the second plate portion 42. As illustrated in FIGS. 1 and 2, in the bracket 4, a first shaft hole 415 in which the guide shaft 5 is fitted is formed in the first plate portion 41, and a second shaft hole 425 in which the guide shaft 5 is fitted is formed in the second plate portion 42. Therefore, when the guide shaft 5 is provided, the guide shaft 5 is inserted into the first shaft hole 415 and the second shaft hole 425 along the axis L of the lead screw 2. Here, the guide shaft 5 is pressed into one shaft hole of the first shaft hole 415 and the second shaft hole 425, and an inner diameter of the other shaft hole is greater than an outer diameter of the guide shaft 5. In this embodiment, the guide shaft 5 is pressed into the first shaft hole 415 among the first shaft hole 415 and the second shaft hole 425, and an inner diameter of the second shaft hole 425 is greater than an outer diameter of the guide shaft 5.

Here, in the guide shaft 5, a portion 5a in a circumferential direction abuts against the inner circumferential surface of the second shaft hole 425, and the other portion in the circumferential direction abuts against a partial overhanging portion 425c on the inner circumferential surface of the second shaft hole 425 (a portion indicated by an alternate long and short dash line). In the embodiment, in the outer circumferential surface of the guide shaft 5, the portion 5a on the lower side in the circumferential direction in which the third plate portion 43 is located abuts against a portion 425a in which the third plate portion 43 of the inner circumferential surface of the second shaft hole 425 is located, and the guide shaft 5 and a partial overhanging portion 425c on the inner circumferential surface of the second shaft hole 425 abut against each other at two places 425b in the circumferential direction located on the side opposite to the third plate portion 43.

Therefore, since the guide shaft 5 is disposed with reference to a place against which a portion in the circumferential direction of the guide shaft 5 abuts on the inner circumferential surface of the second shaft hole 425, it is possible to provide the guide shaft 5 at an appropriate position when a place against which a portion of the guide shaft 5 abuts on the inner circumferential surface of the second shaft hole 425 is accurately formed with respect to the first shaft hole 415. Therefore, it is possible to improve, for example, the accuracy of parallelism between the lead screw 2 and the guide shaft 5. In particular, in the embodiment, the guide shaft 5 is fixed in the second shaft hole 425 using the overhanging portion 425c in which an edge of the second shaft hole 425 is plastically deformed at the two places 425b on both sides with the virtual plane P illustrated in FIG. 9 interposed therebetween and formed through a caulking process in which the inner circumferential surface of the second shaft hole 425 is brought close toward the guide shaft 5. Therefore, the guide shaft 5 is pressed in a downward direction, as indicated by an arrow S after caulking. Accordingly, the guide shaft 5 can be brought close to the side on which the lead screw 2 is located, and a portion (portion 5a)

located just below the guide shaft 5 can abut against the portion 425*a* located just below the second shaft hole 425. Such a configuration may be applied to a case in which the guide shaft 5 is pressed into the second shaft hole 425 and an inner diameter of the first shaft hole 415 is greater than an outer diameter of the guide shaft 5.

In this embodiment, since the guide shaft 5 is supported with respect to the first plate portion 41 and the second plate portion 42 of the bracket 4, and the lead screw 2 is supported with respect to the second plate portion 42 of the bracket 4, ribs 44 for reinforcement are provided on the inner side of a bent portion between the first plate portion 41 and the third plate portion 43 and the inner side of a bent portion between the second plate portion 42 and the third plate portion 43 as illustrated in FIGS. 1 and 2, such that strength of the bent portion of the first plate portion 41 and the second plate portion 42 with respect to the third plate portion 43 can be improved and oblique inclination is suppressed. In this embodiment, the ribs 44 are formed using press working.

[Method of Producing Linear Drive Device 100]

Figure 18:
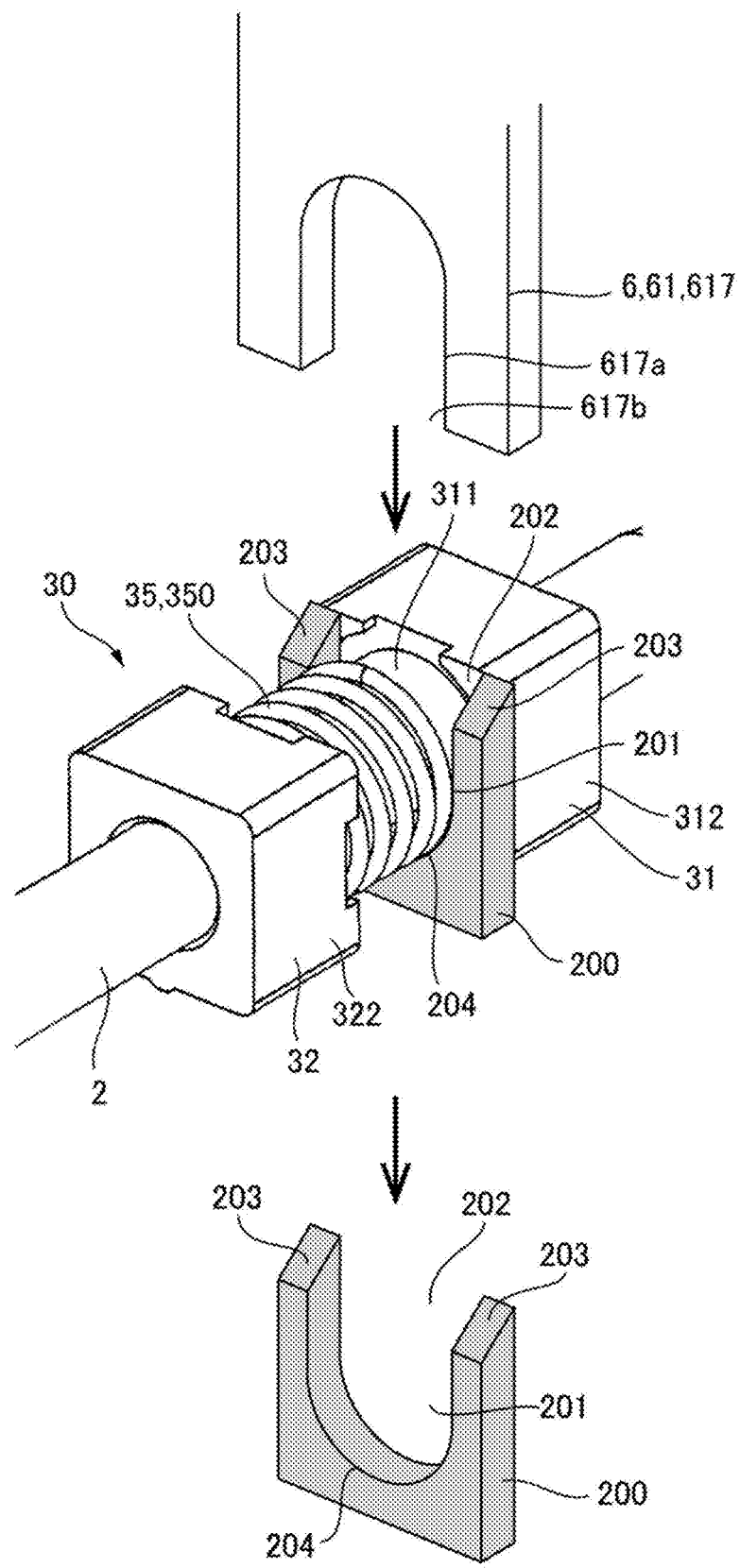
FIG. 18 is an illustrative view illustrating a linear drive device production method to which the present invention is applied.

FIG. 18 is an illustrative view illustrating a method of producing the linear drive device 100 to which the present invention is applied, and illustrates a process of mounting the nut mechanism 30 on the movable member 6. In a step of producing the linear drive device 100 according to this embodiment, in a step of mounting the nut mechanism 30 on the movable member 6, the lead screw 2 is passed through the first nut portion 31, the coil spring 350 and the second nut portion 32, as illustrated in FIG. 18. In this case, a jig 200 having a thickness equal to that of the second support plate portion 617 of the movable member 6 or slightly greater than that of the second support plate portion 617 is sandwiched between the first nut portion 31 and the coil spring 350. Here, the jig 200 is movable in a direction orthogonal to the axis L of the lead screw 2.

The jig 200 is a plate-like member having a notch 201 of which one end is an open end 202. In the notch 201, an inner circumferential surface on the side opposite to the open end 202 is a circular arc surface 204 that is bent along the cylindrical portion 311 of the first nut portion 31 and abuts against the cylindrical portion 311 of the first nut portion 31. Therefore, when the jig 200 is pushed with the open end 202 directed to the first nut portion 31, the jig 200 is plugged between the flange portion 312 of the first nut portion 31 and the coil spring 350, and the flange portion 312 and the coil spring 350 are held at a space allowing the second support plate portion 617 to be inserted. Here, since a distal end portion of the jig 200 is an inclined surface 203 in which the side in which the flange portion 312 is located is sharp, the jig 200 is plugged between the flange portion 312 of the first nut portion 31 and the coil spring 350 easily.

Next, when the movable member 6 is caused to approach the side in which the first nut portion 31 is located from the direction orthogonal to the direction of the axis L, the jig 200 is pushed in the direction orthogonal to the direction of the axis L by the second support plate portion 617, and therefore, the lead screw 2 is disengaged from the notch 201 through the open end 202 and plugged into the inner side of the opening portion 617*a* through the open end 617*b*. As a result, the second support plate portion 617 is inserted between the flange portion 312 of the first nut portion 31 and the coil spring 350. Therefore, it is possible to efficiently mount the nut mechanism 30 in the movable member 6.

Modification Example of Present Invention

Figure 19A:
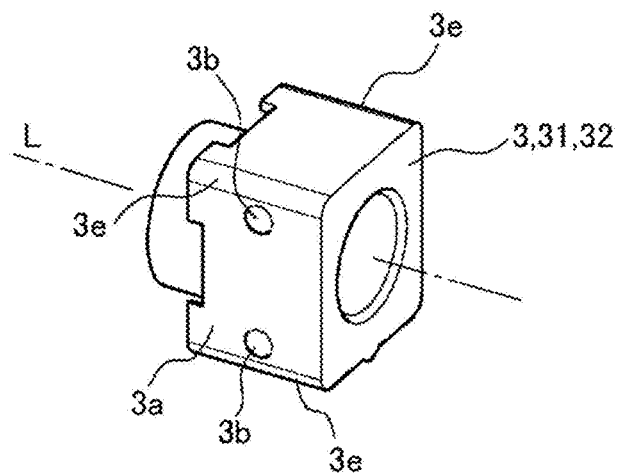
FIG. 19(a) and FIG. 19(b) are perspective views of a nut portion used for a linear drive device according to a modification example of the present invention.
Figure 19B:
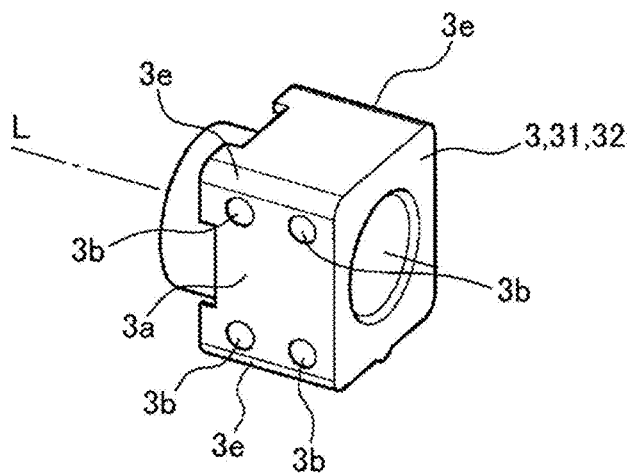
Figure 20A:
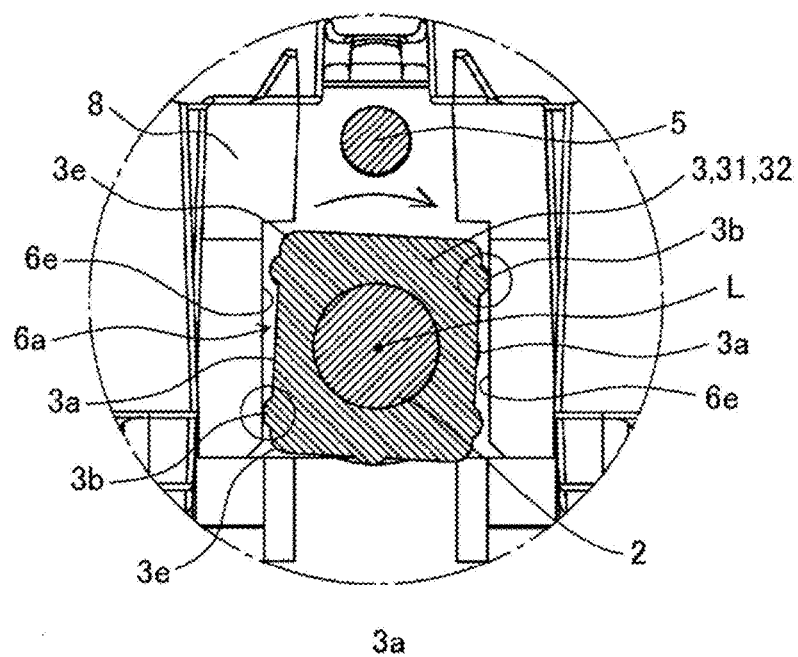
FIG. 20(a) and FIG. 20(b) are illustrative views schematically illustrating a state when the nut portion illustrated in FIG. 19(a) and FIG. 19(b) has been rotated around an axis of the lead screw.

FIG. 19(*a*) and FIG. 19(*b*) are perspective views of the nut portion 3 used for the linear drive device 100 according to a modification example of the present invention, FIG. 19(*a*) is a perspective view of the nut portion 3 according to a first modification example, and FIG. 19(*b*) is a perspective view of a nut portion according to a second modification example. FIG. 20(*a*) and FIG. 20(*b*) are illustrative views schematically illustrating a state when the nut portion 3 illustrated in FIG. 19(*a*) and FIG. 19(*b*) is rotated around the axis L of the lead screw 2, FIG. 20(*a*) is a cross-sectional view of main portions illustrating an abutting state of the nut portion 3 and the inner wall of the nut accommodating portion 6*a* when the nut portion 3 has rotated in a clockwise direction, and FIG. 20(*b*) is a cross-sectional view of main portions illustrating an abutting state of the nut portion 3 and the inner wall of the nut accommodating portion 6*a* when the nut portion 3 has rotated in a counterclockwise direction. FIG. 21(*a*) and FIG. 21(*b*) are illustrative views schematically illustrating a state when the nut portion 3 is rotated around the axis L of the lead screw 2 in a case in which the projection 3*b* illustrated in FIG. 19(*a*) and FIG. 19(*b*) is not provided. FIG. 21(*a*) is a cross-sectional view of main portions illustrating an abutting state of the nut portion 3 and the inner wall of the nut accommodating portion 6*a* when the nut portion 3 rotates in a clockwise direction, and FIG. 21(*b*) is a cross-sectional view of main portions illustrating an abutting state of the nut portion 3 and the inner wall of the nut accommodating portion 6*a* when the nut portion 3 rotates in a counterclockwise direction. FIG. 22 is a front view when the bracket is removed in the linear drive device 100 according to the modification example of the present invention.

In FIG. 19(*a*) and FIG. 19(*b*), in at least one of the two nut portions 3 used for the linear drive device of the embodiment, the projections 3*b* (three-dimensional convex curved surfaces) each having a substantially hemispherical shape are formed at both end portions in a rotation direction on two rectangular faces 3*a* facing with respect to the axis of the nut portion 3, which are central portions in the direction of the axis L, so that the projections 3*b* are symmetrical with the axis L, as illustrated in FIG. 19(*a*). In this embodiment, the projections 3*b* are formed in both of the first nut portion 31 and the second nut portion 32.

Here, the projection 3*b* is formed with position and height dimensions allowing the projection 3*b* to abut against the inner wall 6*e* of the nut accommodating portion 6*a* earlier than corner portion 3*e* of the outer circumferential surface of the nut portion 3 when the nut portion 3 rotates around the axis L of the lead screw 2, as illustrated in FIG. 20(*a*). That is, the projections 3*b* are provided with a height dimension allowing an outer surface to come in point-contact with the inner wall 6*e* of the nut accommodating portion 6*a* at both end portions in the rotation direction on the rectangular faces 3*a* of the outer circumferential surface of the nut portion 3 facing the inner wall 6*e* (a wall surface) of the nut accommodating portion 6*a* when the nut portion 3 rotates around the axis L of the lead screw 2 and abut against the inner wall 6*e* earlier than a corner portion 3*e* of the outer circumferential surface at the time of rotation of the nut portion 3. Therefore, even when a gap is formed between the nut accommodating portion 6*a* and the nut portion 3, the projection 3*b* of the nut portion 3 abuts against the inner wall 6*e* of the nut accommodating portion 6*a* when the motor 1 is started and stopped. Therefore, it is possible to prevent or greatly suppress generation of abnormal noise, which is generated between the nut portion 3 and the movable member 6.

Particularly, since the projections 3*b* are formed at the positions symmetrical with the axis of the nut portion 3 (the axis L of the lead screw 2), the projection 3*b* located on the side opposite to the axis L can be caused to abut against the inner wall 6e of the nut accommodating portion 6a in a well-balanced manner when the motor 1 is started and stopped.

Figure 20B:
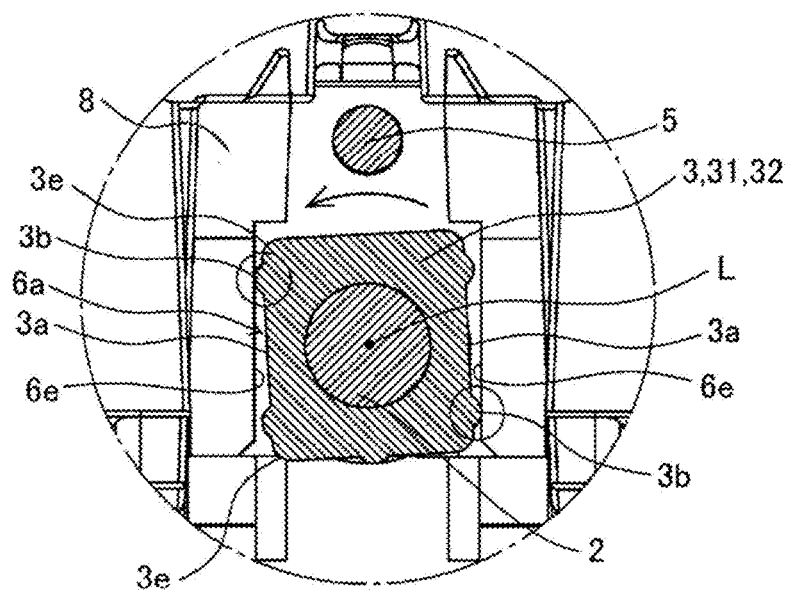

In the nut portion 3 illustrated in FIG. 20(b), projections 3b having substantially hemispherical shapes are respectively formed in both end portions in the rotation direction on the two rectangular surfaces 3a facing the axis line of the nut portion 3 (the axis L of the lead screw 2), which are both end portions in the direction of the axis L. Such projections 3b are also formed with position and height dimensions allowing the projections 3b to abut against the inner wall 6e of the nut accommodating portion 6a earlier than the corner portion 3e of the outer circumferential surface of the nut portion 3 when the nut portion 3 rotates. As a result, it is possible to obtain the same operation and effects in the linear drive device in which the nut portion 3 has been used.

Figure 21A:
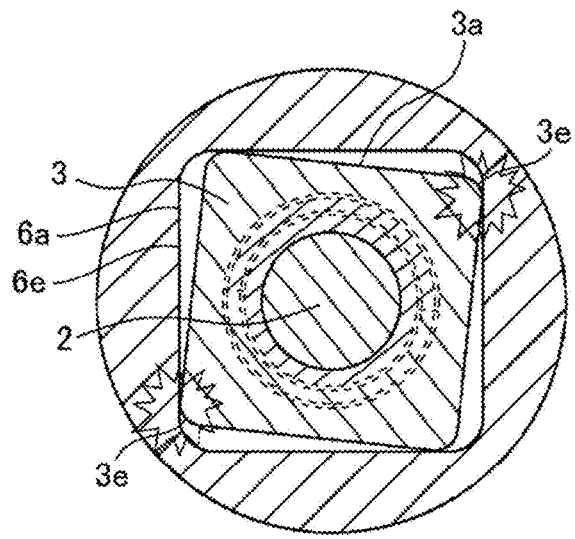
Figure 21B:
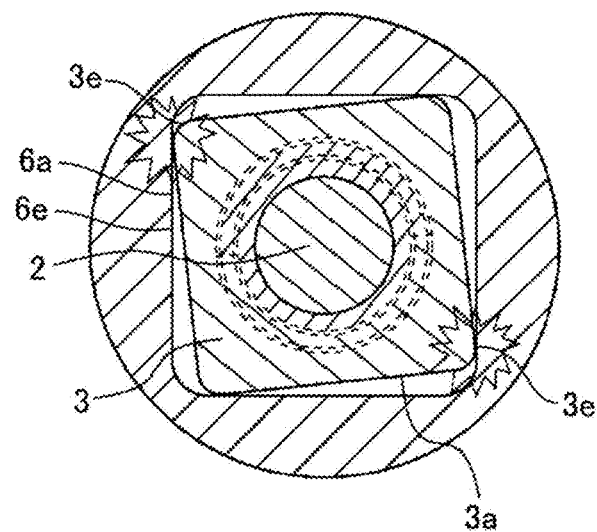
Figure 22:
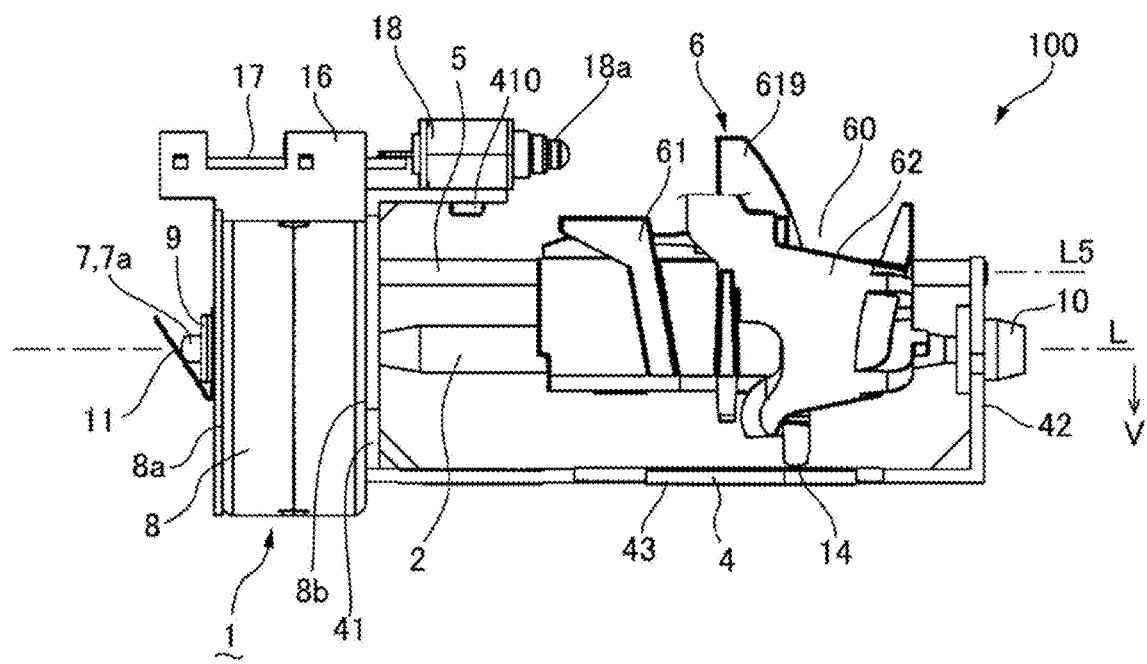
FIG. 22 is a front view when a bracket is removed in a linear drive device according to a modification example of the present invention.
Figure 23:
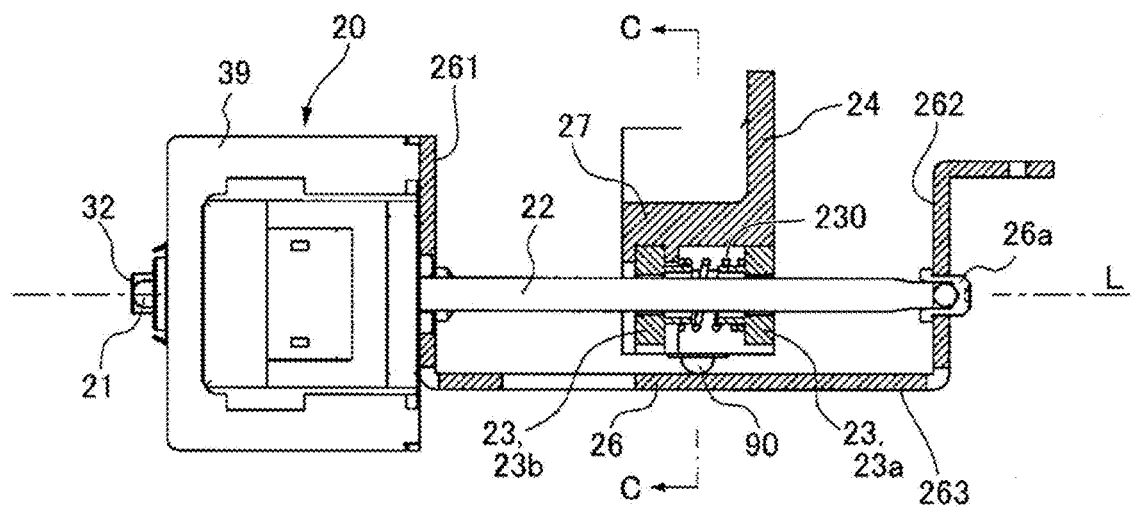
FIG. 23 is an illustrative view of a linear drive device in an example of the related art.
Figure 24:
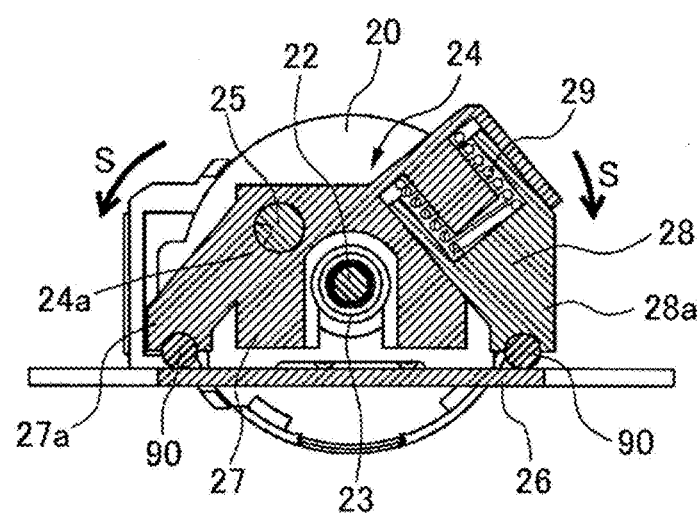
FIG. 24 is an illustrative view of a movable member used for the linear drive device illustrated in FIG. 23.

On the other hand, as illustrated in FIG. 21(a) and FIG. 21(b), when the projection 3b is not provided, the corner portion 3e of the outer circumferential surface of the nut portion 3 abuts against the inner wall 6e of the nut accommodating portion 6a, and therefore, it is easy for abnormal noise to be generated.

The aspect described with reference to FIGS. 19 and 20 may be applied to, for example, the linear drive device 100 using the second spring 11 described with reference to FIG. 8(a) and FIG. 8(b), as illustrated in FIG. 22. It should be noted that, in the embodiment, only the case in which the nut portions 3 all having a square outer shape have been used has been described, but the present invention is not limited thereto and it is possible to obtain the same operation and effects even when other nut portions having an n-angled shape such as a hexagon are used.

Other Embodiments

Although the first nut portion 31 and the second nut portion 32 are configured separately from the movable member 6 in the above embodiment, the first nut portion 31 may be configured integrally with the movable member 6. Although the first spring 35 is the coil spring in the above embodiment, a leaf spring may be used for the first spring 35.

INDUSTRIAL APPLICABILITY

In the present invention, since the movable member is driven using the guide shaft and the lead screw supported by the bracket, it is difficult for rattling to occur when the movable member is driven. Further, since the nut mechanism in which the first spring is disposed between the two nut portions (the first nut portion and the second nut portion) is used, it is possible to suppress the rattling of the nut portions with respect to the lead screw. Even in this case, since the first nut portion provided on the side opposite to the motor and the first plate portion among the two nut portions is not relatively movable with respect to the slider, the driven member is mounted at a position biased to the side opposite to the motor and the first plate portion when the driven member is mounted on the movable member. Therefore, when the movable member is driven in a direction approaching the motor and the first plate portion, it is difficult for the driven member to interfere with the motor, the first plate portion, and members disposed around the motor and the first plate portion. Therefore, even when the rattling is reduced, a movable range of the movable member can be widened, such that it is possible to appropriately reduce the rattling.

The invention claimed is:

1. A linear drive device comprising:
   a motor;
   a lead screw that rotates around an axis integrally with an output shaft of the motor;
   a nut mechanism that constitutes a feed screw mechanism together with the lead screw;
   a guide shaft that extends parallel to the lead screw;
   a movable member that is movably supported by the guide shaft and driven in an axial direction of the lead screw by the motor via the nut mechanism; and
   a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion,
   wherein the nut mechanism includes a first nut portion that is not relatively movable in an axial direction of the lead screw with respect to the movable member, a second nut portion that is relatively movable in the axial direction with respect to the movable member toward the first plate portion side from the first nut portion, and a first spring that biases the second nut portion in the axial direction,
   in the axial direction of the lead screw, the second nut portion is disposed between the motor and the first nut portion,
   wherein the first spring is a coil spring in which the lead screw passes through an inner side thereof,
   the first nut portion includes a first stepped cylinder having female threads meshing with the lead screw formed on an inner circumferential surface of the first stepped cylinder, and a first flange portion having a substantially polygonal shape formed at an end portion of the first stepped cylinder on the side opposite to the coil spring, such that a length of the first stepped cylinder in the axial direction of the lead screw is greater than a length of the first flange portion in the axial direction of the lead screw, and the first stepped cylinder protrudes from the first flange portion in the axial direction of the lead screw,
   the second nut portion includes a second stepped cylinder having female threads meshing with the lead screw formed on an inner circumferential surface of the second stepped cylinder, and a second flange portion having a substantially polygonal shape formed at an end portion of the second stepped cylinder on the side opposite to the coil spring such that a length of the second stepped cylinder in the axial direction of the lead screw is greater than a length of the second flange portion in the axial direction of the lead screw, and the second stepped cylinder protrudes from the second flange portion in the axial direction of the lead screw, and
   the second flange portion receives a first end portion of the first spring.

2. The linear drive device according to claim 1, wherein the lead screw and the guide shaft are disposed at positions overlapping in a vertical direction.

3. The linear drive device according to claim 2,
wherein a mounting portion of a driven member is provided in the movable member, and
a center of the mounting portion overlaps the lead screw and the guide shaft in a vertical direction.

4. The linear drive device according to claim 3, wherein the movable member is formed with plane symmetry with respect to a virtual plane defined by a central axis of the lead screw and a central axis of the guide shaft.

5. The linear drive device according to claim 1, wherein a switch capable of detecting the movable member is held in the bracket.

6. The linear drive device according to claim 5, wherein the switch is held in the first plate portion.

7. The linear drive device according to claim 6,
wherein a fourth plate portion bent toward the second plate portion is provided in an end portion of the first plate portion on the side opposite to the third plate portion, and
the switch is held in the fourth plate portion.

8. The linear drive device according to claim 7, wherein the fourth plate portion is parallel to the third plate portion.

9. The linear drive device according to claim 6, wherein the switch is a contact type switch that detects the movable member according to contact of the movable member.

10. The linear drive device according to claim 9, wherein a fifth plate portion that projects to the side opposite to the third plate portion and is able to come into contact with the switch is provided in the movable member.

11. The linear drive device according to claim 1,
wherein the second flange portion has a substantially rectangular shape.

12. The linear drive device according to claim 1, wherein in the second nut portion, a groove-like concave portion that receives the first end portion of the first spring is formed on a surface of the second flange portion on a coil spring side.

13. The linear drive device according to claim 12, wherein the groove-like concave portion has a depth equal to or greater than ½ of a diameter of a wire material constituting the coil spring.

14. The linear drive device according to claim 12, wherein the groove-like concave portion is formed between the second stepped cylinder and a projection projecting toward the coil spring side from the second flange portion.

15. The linear drive device according to claim 1,
wherein the first flange portion has a substantially rectangular shape,
the movable member includes a support plate portion that is interposed between the coil spring and the first flange portion of the first nut portion and against which a second end portion of the coil spring on the first nut portion side and a surface of the first nut portion on the coil spring side of the first flange portion abut,
a notch-like opening portion directed to an open end in a direction perpendicular to the axial direction is formed in the support plate portion,
the first stepped cylinder of the first nut portion is located on an inner side of the opening portion, and
an inner circumferential surface located on the side opposite to the open end side of the opening portion is a circular arc surface that is bent along an outer circumferential surface of the first stepped cylinder of the first nut portion and abuts against the first stepped cylinder of the first nut portion.

16. The linear drive device according to claim 15, wherein a mark that aligns an angular position of the first nut portion and the second nut portion is provided in each of the first nut portion and the second nut portion.

17. The linear drive device according to claim 16, wherein the mark is located on the side to which the open end is directed in each of the first nut portion and the second nut portion.

18. The linear drive device according to claim 16, wherein the mark is a projecting ridge.

19. The linear drive device according to claim 1,
wherein a first shaft hole into which the guide shaft is fitted is formed in the first plate portion,
a second shaft hole into which the guide shaft is fitted is formed in the second plate portion,
the guide shaft is pressed into one shaft hole of the first shaft hole and the second shaft hole, an inner diameter of the other shaft hole being greater than an outer diameter of the guide shaft, and
a portion of the guide shaft in the circumferential direction abuts against an inner circumferential surface of the other shaft hole, and another portion in the circumferential direction abuts against a partial overhanging portion of the inner circumferential surface of the other shaft hole.

20. The linear drive device according to claim 19,
wherein the portion of the guide shaft abuts against an inner circumferential surface of the other shaft hole on the lead screw side in a circumferential direction of the guide shaft, and
the other portion of the guide shaft abuts against the overhanging portion formed by caulking on the side opposite to the lead screw in the circumferential direction of the guide shaft.

21. The linear drive device according to claim 1,
wherein in the output shaft, an opposite output side end portion located on the side opposite to the bracket projects from an opposite output side end surface located on the side opposite to the bracket of the casing,
a second spring having a plate shape that presses the opposite output side end portion of the output shaft toward the output side in which the bracket is located is fixed to the opposite output side end surface,
the opposite output side end portion is formed by a flat surface or a spherical surface, and
the second spring includes a fixing portion fixed to the opposite output side end surface of the casing, a biasing portion that is bent to be spaced apart from the output shaft and extends to the side in which the opposite output side end portion is located from the fixing portion, and a pressing portion that extends in a direction in which the pressing portion is spaced apart from the opposite output side end portion while being bent in a direction opposite to the biasing portion to abut against the opposite output side end portion from the biasing portion.

22. The linear drive device according to claim 1, wherein in at least one nut portion of the first nut portion and the second nut portion, a projection that abuts against a wall surface of the movable member earlier than a corner of an outer circumferential surface of the nut portion when the nut portion tries to rotate around the axis line is provided.

23. A linear drive device comprising:
a motor;
a lead screw that rotates around an axis integrally with an output shaft of the motor;
a nut mechanism that constitutes a feed screw mechanism together with the lead screw;
a guide shaft that extends parallel to the lead screw;

a movable member that is movably supported by the guide shaft and driven in an axial direction of the lead screw by the motor via the nut mechanism; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein the nut mechanism includes a first nut portion that is not relatively movable in an axial direction of the lead screw with respect to the movable member, a second nut portion that is relatively movable in the axial direction with respect to the movable member toward the first plate portion side from the first nut portion, and a first spring that biases the second nut portion in the axial direction wherein the third plate portion extends in parallel to the guide axis, and the movable member includes a pair of flexible buffering arm portions that project toward opposite sides with the lead screw interposed therebetween to face the third plate portion, and a leg portion which is bent toward the third plate portion from a distal end of each of the pair of buffering arm portions and abuts against the third plate portion.

24. A linear drive device comprising:

a motor;

a lead screw that rotates around an axis integrally with an output shaft of the motor;

a nut mechanism that constitutes a feed screw mechanism together with the lead screw;

a guide shaft that extends parallel to the lead screw;

a movable member that is movably supported by the guide shaft and driven in an axial direction of the lead screw by the motor via the nut mechanism; and a bracket that includes a first plate portion fixed to an output side end surface of a casing of the motor located on the lead screw side, a second plate portion facing the first plate portion on a distal end side of the lead screw, and a third plate portion connecting the first plate portion to the second plate portion, and a bearing rotatably supporting the distal end side of the lead screw being held on the second plate portion, wherein the nut mechanism includes a first nut portion that is not relatively movable in an axial direction of the lead screw with respect to the movable member, a second nut portion that is relatively movable in the axial direction with respect to the movable member, and a first spring that biases the second nut portion in the axial direction, in the axial direction of the lead screw, the second nut portion is disposed between the motor and the first nut portion, wherein the first spring is a coil spring in which the lead screw passes through an inner side thereof, the first nut portion includes a first stepped cylinder having female threads meshing with the lead screw formed on an inner circumferential surface of the first stepped cylinder, and a first flange portion having a substantially polygonal shape formed at an end portion of the first stepped cylinder on the side opposite to the coil spring, such that a length of the first stepped cylinder in the axial direction of the lead screw is greater than a length of the first flange portion in the axial direction of the lead screw, and the first stepped cylinder protrudes from the first flange portion in the axial direction of the lead screw, the second nut portion includes a second cylindrical portion having female threads meshing with the lead screw formed on an inner circumferential surface of the second cylindrical portion, and a second flange portion having a substantially polygonal shape formed at an end portion of the second cylindrical portion on the side opposite to the coil spring such that a length of the second cylindrical portion in the axial direction of the lead screw is greater than a length of the second flange portion in the axial direction of the lead screw, and the second cylindrical portion protrudes from the second flange portion in the axial direction of the lead screw, the second flange portion receives a first end portion of the first spring, and a mark that aligns an angular position of the first nut portion and the second nut portion is provided in each of the first nut portion and the second nut portion.

25. A linear drive device production method, the linear drive device comprising a motor, a lead screw that rotates around an axis integrally with an output shaft of the motor, a nut mechanism that constitutes a feed screw mechanism together with the lead screw, a guide shaft that extends parallel to the lead screw, and a movable member that is movably supported by the guide shaft, the nut mechanism including a first nut portion disposed in a nut accommodating portion of the movable member not to be relatively movable in an axial direction of the lead screw with respect to the movable member, a second nut portion disposed to be relatively movable in the axial direction from the first nut portion, and a first spring biasing the second nut portion in the axial direction, in the axial direction of the lead screw, the second nut portion is disposed between the motor and the first nut portion, wherein the first spring is a coil spring in which the lead screw passes through an inner side thereof, the first nut portion includes a first stepped cylinder having female threads meshing with the lead screw formed on an inner circumferential surface of the first stepped cylinder, and a first flange portion having a substantially polygonal shape formed at an end portion of the first stepped cylinder on the side opposite to the coil spring, such that a length of the first stepped cylinder in the axial direction of the lead screw is greater than a length of the first flange portion in the axial direction of the lead screw, and the first stepped cylinder protrudes from the first flange portion in the axial direction of the lead screw, the second nut portion includes a second stepped cylinder having female threads meshing with the lead screw formed on an inner circumferential surface of the second stepped cylinder, and a second flange portion having a substantially polygonal shape formed at an end portion of the second stepped cylinder on the side opposite to the coil spring such that a length of the second stepped cylinder in the axial direction of the lead screw is greater than a length of the second flange portion in the axial direction of the lead screw, and the second stepped cylinder protrudes from the second flange portion in the axial direction of the lead screw, and the second flange portion receives a first end portion of the first spring, and the movable member comprising a support plate portion located between the first nut portion and the first spring in the nut accommodating portion, wherein in the linear drive device production method, a notch-like opening portion directed to an open end in a direction orthogonal to the axial direction is provided in the support plate portion, a jig in which a notch having one end as an open end being formed is prepared, and in a step of assembling the first nut portion in the nut accommodating portion, disposing the first spring between the first nut portion and the second nut portion attached to the lead screw, disposing the jig between the first spring and the second spring, and then, causing the lead screw and the movable member to approach each other in a direction orthogonal to the axial direction, and pushing the jig by the support plate portion such that the lead screw is disengaged from the notch through the open end of the notch and plugged into the inner side of the opening portion through the open end of the opening portion.

* * * * *